(12) United States Patent
Wang et al.

(10) Patent No.: US 10,401,979 B2
(45) Date of Patent: Sep. 3, 2019

(54) ADJUSTABLE MOUSE

(71) Applicant: CONTOUR DESIGN, INC., Windham, NH (US)

(72) Inventors: Steven Wang, Windham, NH (US); Hanning Lu, Guangzhou (CN); ZhiJian Huang, Lechang (CN); James H. Bleck, Chelmsford, MA (US); William D. Chura, Newton, MA (US); Thomas Eagan, Chelmsford, MA (US); James Saunders, Lowell, MA (US); Scott H. Wakefield, Andover, MA (US); Jonathan N. Towle, Amherst, NH (US); Changjun Zhao, Henan (CN); Andrew David Morgan, Windham, NH (US)

(73) Assignee: CONTOUR DESIGN, INC., Windham, NH (US)

( * ) Notice: Subject to any disclaimer, the term of this patent is extended or adjusted under 35 U.S.C. 154(b) by 59 days.

(21) Appl. No.: 15/466,339

(22) Filed: Mar. 22, 2017

(65) Prior Publication Data

US 2017/0192536 A1    Jul. 6, 2017

Related U.S. Application Data

(63) Continuation-in-part of application No. PCT/CN2015/096183, filed on Dec. 1, 2015.
(Continued)

(51) Int. Cl.
*G06F 3/0354* (2013.01)

(52) U.S. Cl.
CPC .. *G06F 3/03543* (2013.01); *G06F 2203/0333* (2013.01); *G06F 2203/0334* (2013.01)

(58) Field of Classification Search
None
See application file for complete search history.

(56) References Cited

U.S. PATENT DOCUMENTS 5,260,696 A * 11/1993 Maynard, Jr. ....... G06F 3/03543
                                                        345/157
5,576,733 A    11/1996 Lo
(Continued)

FOREIGN PATENT DOCUMENTS

CN      2828923 Y    10/2006
CN    201378302 Y     1/2010
(Continued)

OTHER PUBLICATIONS

International Search Report and Written Opinion from corresponding PCT/CN2015/096183 dated Feb. 23, 2016.
(Continued)

*Primary Examiner* — Dorothy Harris
(74) *Attorney, Agent, or Firm* — Lando & Anastasi, LLP

(57) ABSTRACT

An adjustable mouse includes a base and a thumb adjustment assembly coupled to the base. The thumb adjustment assembly is configured to move a thumb rest portion between a retracted position and an extended position. The adjustable mouse further may include a palm rest portion hingedly attached to the base by a hinge adjacent an outer edge of the base. The palm rest portion may have several fingers configured to expand in vertical and lateral directions. Embodiments of the adjustable mouse are further disclosed.

25 Claims, 22 Drawing Sheets

Related U.S. Application Data

(60) Provisional application No. 62/086,471, filed on Dec. 2, 2014.

(56) References Cited

U.S. PATENT DOCUMENTS

| | | | |
|---|---|---|---|
| D383,453 S | 9/1997 | Scenna et al. | |
| 5,826,842 A * | 10/1998 | Paulse | A47B 21/0371 248/118.1 |
| 5,870,081 A * | 2/1999 | Wu | G06F 3/03543 345/163 |
| 5,894,302 A * | 4/1999 | Scenna | G06F 3/03543 345/156 |
| 5,990,870 A * | 11/1999 | Chen | G06F 3/03543 345/156 |
| 6,031,523 A * | 2/2000 | Bunke | G06F 3/0354 345/157 |
| 6,072,471 A | 6/2000 | Lo | |
| 6,157,370 A * | 12/2000 | Kravtin | G06F 3/03543 248/118.1 |
| D447,748 S | 9/2001 | Loughnane et al. | |
| D448,380 S | 9/2001 | Sheehan et al. | |
| 6,362,811 B1 * | 3/2002 | Edwards | G06F 3/03543 248/118.1 |
| 6,396,478 B1 | 5/2002 | Kravtin et al. | |
| D461,188 S | 8/2002 | Lo | |
| 6,489,947 B2 | 12/2002 | Hesley et al. | |
| 6,625,423 B1 | 9/2003 | Wang | |
| 6,727,889 B2 * | 4/2004 | Shaw | G06F 3/0338 345/161 |
| 6,847,352 B2 * | 1/2005 | Lantigua | G06F 3/03543 248/118.1 |
| D556,711 S | 12/2007 | Lee et al. | |
| D627,355 S | 11/2010 | Blanchard | |
| D632,691 S | 2/2011 | Lo | |
| D681,039 S | 4/2013 | Altaai | |
| 8,547,334 B2 * | 10/2013 | Min-Liang | G06F 3/03543 345/156 |
| 8,884,879 B2 * | 11/2014 | Lo | G06F 3/03543 345/163 |
| 9,092,073 B1 * | 7/2015 | Wang | G06F 3/03543 |
| D753,116 S | 4/2016 | Lo | |
| D768,633 S | 10/2016 | Helwig et al. | |
| 9,569,014 B2 | 2/2017 | Drougge | |
| 9,684,387 B2 | 6/2017 | Wang et al. | |
| D792,882 S | 7/2017 | Helwig et al. | |
| D793,393 S | 8/2017 | Jeong et al. | |
| D813,869 S | 3/2018 | Hu | |
| D819,034 S | 5/2018 | Lo | |
| 10,088,918 B1 | 10/2018 | Lo | |
| D834,022 S | 11/2018 | Gleeson et al. | |
| D834,577 S | 11/2018 | Odgers et al. | |
| 10,198,087 B2 | 2/2019 | Chen et al. | |
| 2001/0028361 A1 * | 10/2001 | Culver | G06F 3/016 715/701 |
| 2002/0084985 A1 * | 7/2002 | Hesley | G06F 3/03543 345/163 |
| 2002/0118174 A1 * | 8/2002 | Rodgers | G06F 3/03543 345/163 |
| 2003/0090464 A1 | 5/2003 | Lai et al. | |
| 2003/0214484 A1 | 11/2003 | Haywood | |
| 2004/0169640 A1 * | 9/2004 | Chao | G06F 3/03543 345/163 |
| 2004/0246231 A1 * | 12/2004 | Large | G06F 3/03543 345/163 |
| 2005/0030278 A1 * | 2/2005 | Fu | G06F 3/033 345/156 |
| 2005/0062716 A1 * | 3/2005 | Rogers | G06F 3/03543 345/163 |
| 2005/0174331 A1 * | 8/2005 | Vayda | G06F 3/0481 345/167 |
| 2006/0170655 A1 * | 8/2006 | Hou | G06F 3/03543 345/163 |
| 2009/0046064 A1 | 2/2009 | Manalo et al. | |
| 2009/0295726 A1 * | 12/2009 | Kimura | G06F 3/03543 345/163 |
| 2009/0303183 A1 * | 12/2009 | Chen | G06F 3/03543 345/163 |
| 2010/0253627 A1 * | 10/2010 | Atzmon | G06F 3/03543 345/163 |
| 2012/0081285 A1 * | 4/2012 | Atzmon | G06F 3/0338 345/163 |
| 2014/0267040 A1 | 9/2014 | Theytaz et al. | |
| 2015/0022451 A1 * | 1/2015 | Drougge | G06F 3/03543 345/163 |
| 2015/0109208 A1 * | 4/2015 | Wang | G06F 3/03543 345/163 |
| 2015/0138093 A1 * | 5/2015 | Young | G06F 3/0312 345/166 |
| 2015/0301559 A1 * | 10/2015 | Wu | F16M 11/041 248/229.16 |

FOREIGN PATENT DOCUMENTS

| | | | | |
|---|---|---|---|---|
| CN | 202008637 U | 10/2011 | | |
| CN | 102369500 A | 3/2012 | | |
| CN | 103123540 A | 5/2013 | | |
| CN | 203038218 U | 7/2013 | | |
| CN | 203102185 U | 7/2013 | | |
| CN | 203465682 U | 3/2014 | | |
| CN | 104423633 A | 3/2015 | | |
| KR | 20040063774 A | 7/2004 | | |
| KR | 20040063774 A * | 7/2004 | | |
| WO | 9621907 A2 | 7/1996 | | |
| WO | WO-0188898 A1 * | 11/2001 | | G06F 3/03543 |
| WO | 2013103315 A2 | 7/2013 | | |
| WO | 2013103315 A3 | 10/2013 | | |
| WO | 2014122191 A1 | 8/2014 | | |
| WO | 2016/086854 A1 | 6/2016 | | |

OTHER PUBLICATIONS

Gasior, G., "Cyborg's RAT 7 adjustable gaming mouse," The Tech Report PC Hardware Explored, Oct. 6, 2010, pp. 1-5.

Greenwald, W., "Cyborg R.A.T. 9 Gaming Mouse," PCMag.com, Jun. 14, 2011, pp. 1-6.

\* cited by examiner

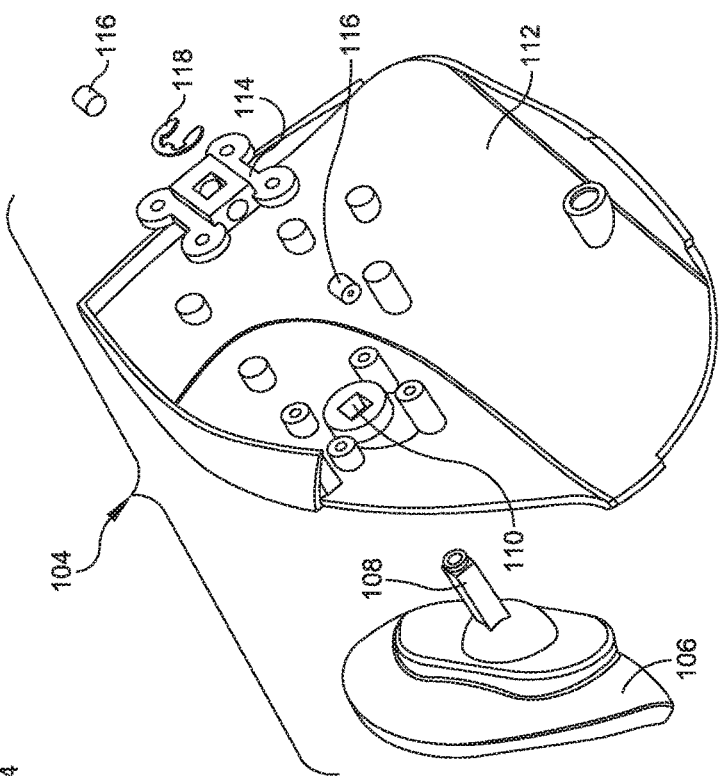
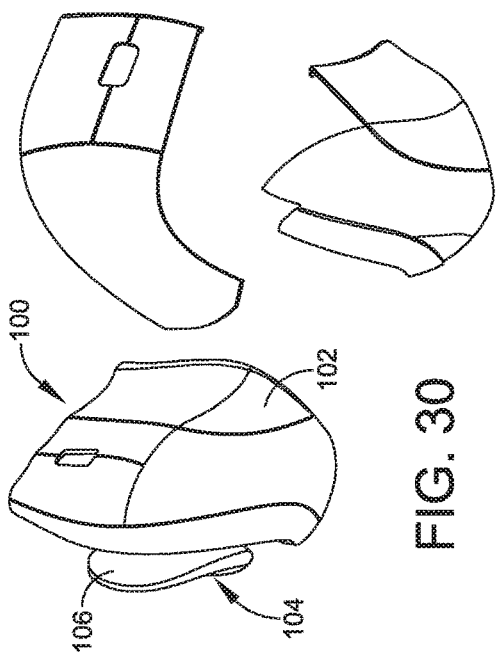
FIG. 32
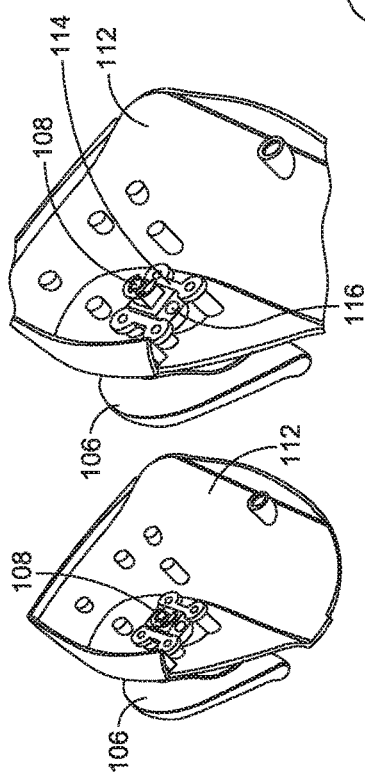
FIG. 31A    FIG. 31B
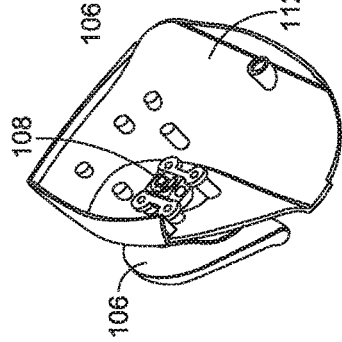
FIG. 30

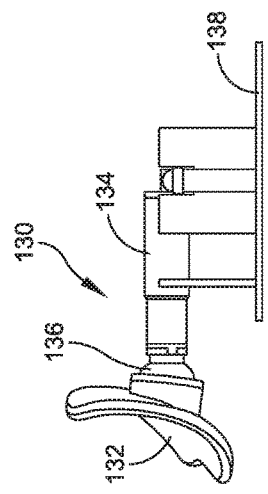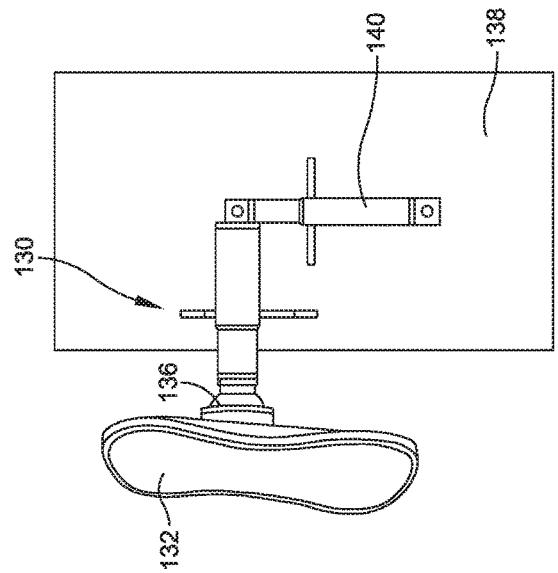
FIG. 33A
FIG. 33B
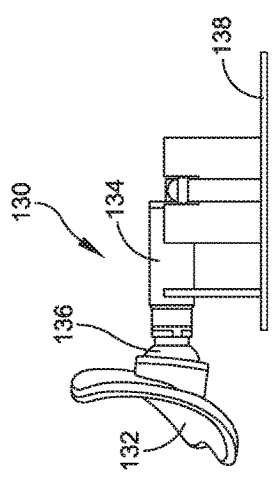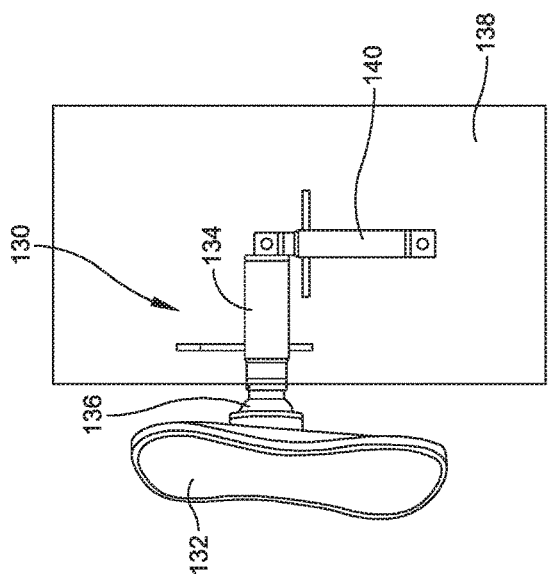
FIG. 34A
FIG. 34B

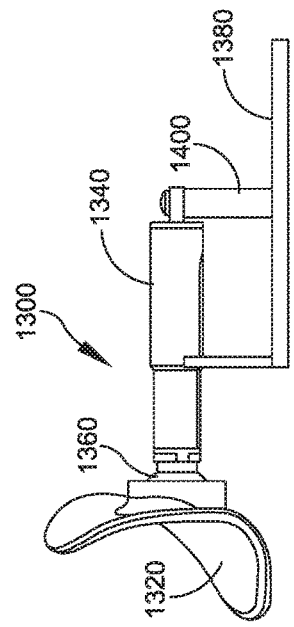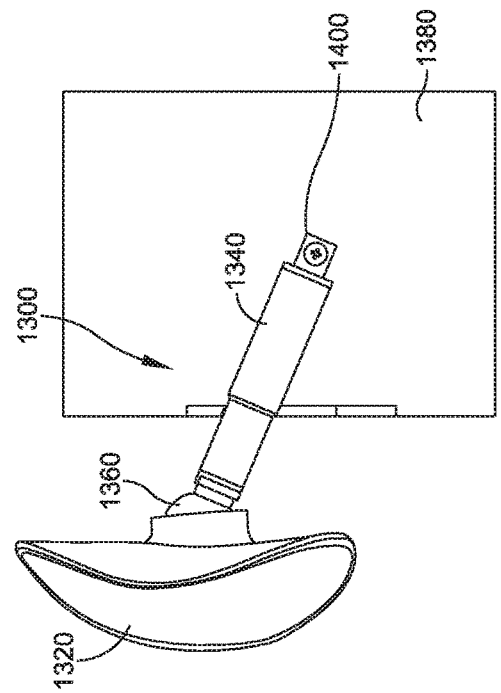
FIG. 35A　　　FIG. 35B
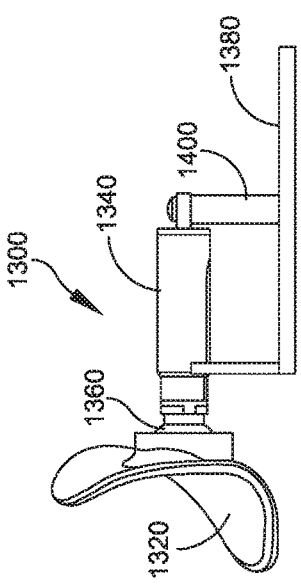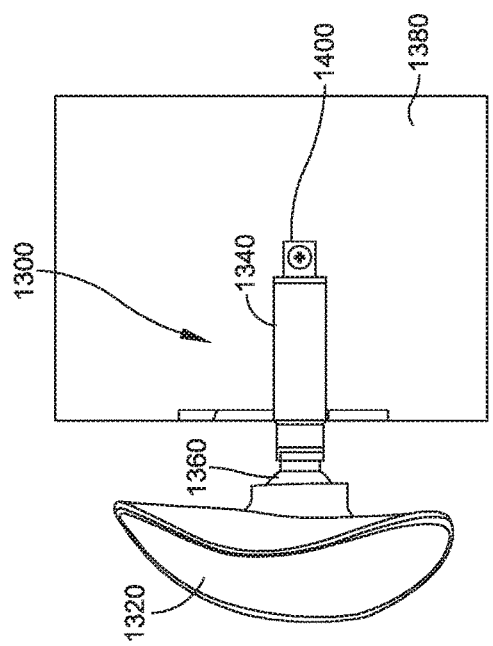
FIG. 36A　　　FIG. 36B

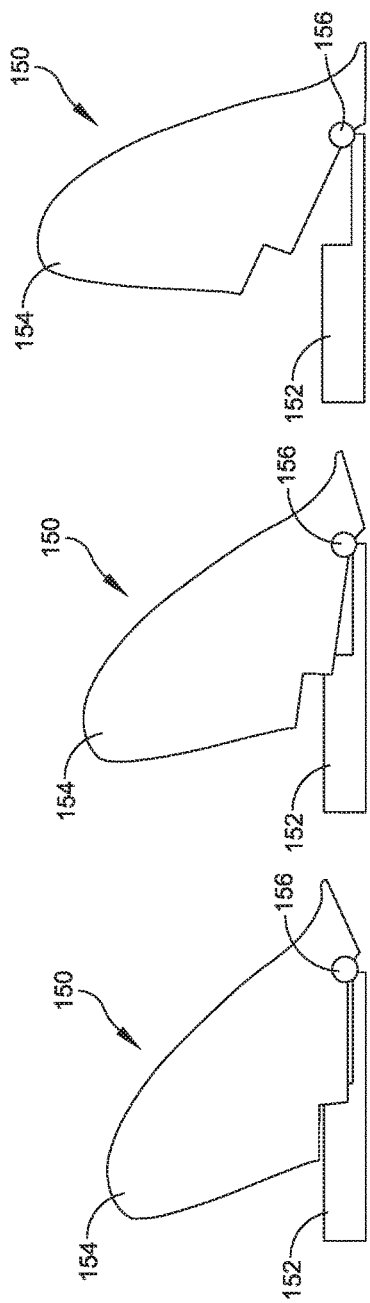
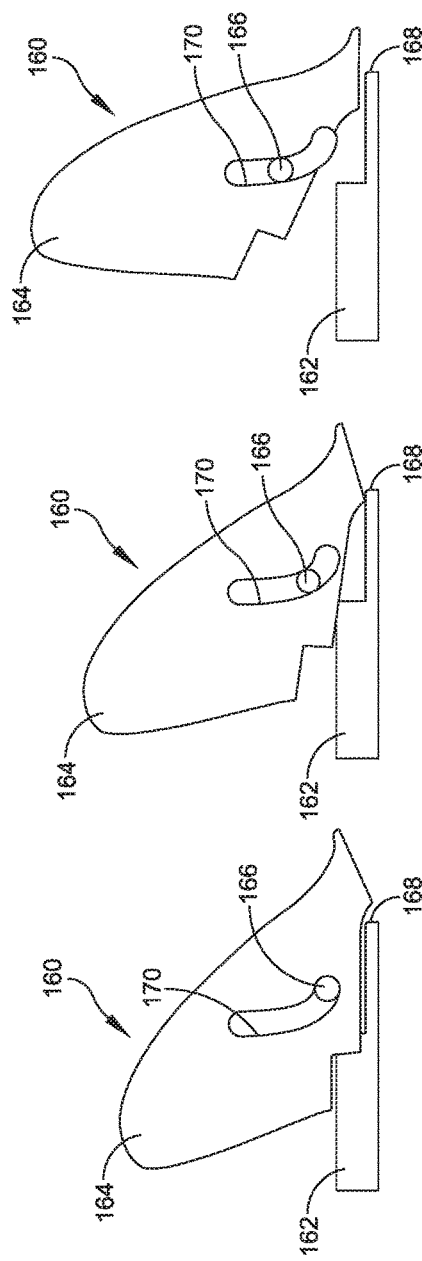

ADJUSTABLE MOUSE

CROSS-REFERENCE TO RELATED APPLICATIONS

This application is a continuation-in-part of International Application No. PCT/CN2015/096183, filed Dec. 1, 2015, titled ADJUSTABLE MOUSE, which claims priority to U.S. Provisional Patent Application No. 62/086,471, filed Dec. 2, 2014, titled ADJUSTABLE MOUSE, both of which are incorporated by reference in its entirety for all purposes.

BACKGROUND OF THE DISCLOSURE

This disclosure relates generally to pointing devices, and more specifically to an adjustable mouse that detects two-dimensional motion relative to a surface and enables fine control of a graphical user interface ("GUI").

A typical mouse includes two or more buttons and a scroll wheel, which can also act as an additional button to move a pointer in two dimensions on a GUI. It is desirable that the mouse fits comfortably within the user's hand while manipulating the mouse. Such ergonomically designed devices can be found in U.S. Pat. Nos. 5,576,733, 6,072,471, D461,188, and D632,691. However, none of the devices disclosed in these patents can be adjusted to vary the size of the mouse so that the mouse fits more comfortably within different users' hands.

SUMMARY OF THE DISCLOSURE

Conventional mechanisms such as those explained above suffer from a variety of deficiencies. Embodiments of the invention significantly overcome such deficiencies and provide mechanisms and techniques that provide a mouse comprising a base and a thumb adjustment assembly coupled to the base. In one embodiment, the thumb adjustment assembly is configured to move a thumb rest portion between a retracted position and an extended position. In certain embodiments, the mouse may include a base or finger adjustment assembly coupled to the base. The base adjustment assembly may be configured to move finger buttons between a neutral position for input control and an extended position for input control. The mouse further may include a height adjustment assembly coupled to the base. The height adjustment assembly may be configured to move a palm rest portion and finger buttons between a neutral position and a raised, tilt position.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

One aspect of the disclosure is directed to an adjustable mouse comprising a base and a thumb adjustment assembly coupled to the base. The thumb adjustment assembly is configured to move a thumb rest portion between a retracted position and an extended position.

Embodiments of the adjustable mouse further may include providing the thumb adjustment assembly with a threaded shaft that extends from a body of the thumb rest portion, and a gear assembly associated with the base and threadably connected to the threaded shaft to retract and extend the threaded shaft with respect to the base. The threaded shaft may extend through an opening formed in a base cover portion of the base. The gear assembly may include a first gear threadably coupled to the threaded shaft and a second gear configured to mesh with the first gear. The second gear may be accessible through another opening formed in the cover portion to drive the movement of the first gear when manipulated by a user. The gear assembly further may include a gear housing that secures the first and second gear to the base cover portion and a remainder of the base cover.

The thumb adjustment assembly may include a metal shaft that extends from a body of the thumb rest portion, and a magnetic assembly associated with the base and configured to releasably secure the metal shaft in a desired position with respect to the base. The magnetic assembly may include a magnet housing and at least one magnet supported by the magnet housing. The magnet housing and the at least one magnet may be held in place on the metal shaft by an e-ring clipped onto an end of the metal shaft. The at least one magnet and the metal shaft attach to each other to produce a large static friction force. A user can manipulate the thumb rest portion by axially moving the thumb rest portion with a larger force than the friction force applied by the at least one magnet to the metal shaft of the thumb rest portion.

The thumb adjustment assembly may include a first telescopic shaft secured to the thumb rest portion by a universal ball joint, with the first telescopic shaft being supported by the base to move the thumb rest portion toward and away from the base. In one embodiment, the first telescopic shaft is coupled to the base by a pivot post that extends from the base, with the telescopic shaft being configured to pivot with respect to the base. In another embodiment, the thumb adjustment assembly further may include a second telescopic shaft supported by the base to move the thumb rest portion frontwards and backwards with respect to the base. The thumb rest portion may include two separate pieces, which are attached to one another by a hinge that allows a front piece to move with respect to a back piece. The hinge allows the front piece to change a curvature of the thumb rest portion itself by bending the front piece back and forth. The back piece may be allowed to tilt up and down by a ball and socket connector coupled to the base to achieve a variety of positions. The ball and socket connector may include a head portion that is received within a receptacle formed in the back piece and a receptacle that is configured to receive a head portion attached to a stem, which is attached to a telescoping mechanism associated with the base to move the thumb rest portion from the retracted position to the extended position.

The adjustable mouse further may comprise a palm rest portion hingedly attached to the base by a hinge adjacent an outer edge of the base, with the hinge having sufficient friction to position the palm rest portion at a desired angle in a stable position with respect to the base.

Another aspect of the disclosure is directed to an adjustable mouse comprising a base and a palm rest portion hingedly attached to the base by a hinge adjacent an outer edge of the base. The hinge has sufficient friction to position the palm rest portion at a desired angle in a stable position with respect to the base.

Embodiments of the adjustable mouse further may include configuring the palm rest portion with internal curved rails to direct the angle adjustment of the palm rest portion with respect to the base portion.

Yet another aspect of the disclosure is directed to an adjustable mouse comprising a base and a palm rest portion coupled to the base. The palm rest portion has several fingers configured to expand in vertical and lateral directions.

A further aspect of the disclosure is directed to an adjustable mouse comprising a base a thumb adjustment assembly coupled to the base. The thumb adjustment assembly is configured to move a thumb rest portion between a retracted position and an extended position. The adjustable mouse further comprises a base adjustment assembly coupled to the base. The base adjustment assembly is configured to move finger buttons between a neutral position for input control and an extended position for input control.

Embodiments of the adjustable mouse further may include a height adjustment assembly coupled to the base. The height adjustment assembly is configured to move a palm rest portion and finger buttons between a neutral position and a raised, tilt position.

Another aspect of the disclosure is directed to an adjustable mouse comprising a base and a base adjustment assembly coupled to the base. The base adjustment assembly is configured to move finger buttons between a neutral position for input control and an extended position for input control.

A further aspect of the disclosure is directed to an adjustable mouse comprising a base and a height adjustment assembly coupled to the base. The height adjustment assembly is configured to move a palm rest portion and finger buttons between a neutral position and a raised, tilt position.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 30 is a perspective view of an adjustable mouse of another embodiment of the present disclosure;

FIGS. 31A and 31B are perspective views with portions removed of the mouse shown in FIG. 30 showing a thumb adjustment assembly of yet another embodiment in a retracted position (FIG. 31A) and an extended position (FIG. 31B);

FIG. 32 is an exploded perspective view of the thumb adjustment assembly;

FIGS. 33A and 33B are side and top schematic views of a thumb adjustment assembly of another embodiment showing the thumb adjustment assembly in a retracted position;

FIGS. 34A and 34B are side and top schematic views of the thumb adjustment assembly shown in FIGS. 33A and 33B showing the thumb adjustment assembly in an extended position;

FIGS. 35A and 35B are side and top schematic views of a thumb adjustment assembly of another embodiment showing the thumb adjustment assembly in a retracted position;

FIGS. 36A and 36B are side and top schematic views of the thumb adjustment assembly shown in FIGS. 35A and 35B showing the thumb adjustment assembly in an extended position;

FIGS. 37A, 37B and 37C are schematic views of an adjustable mouse of another embodiment showing an angle adjustment assembly to adjust a palm rest of the adjustable mouse;

FIGS. 38A, 38B and 38C are schematic views of an adjustable mouse of another embodiment showing an angle adjustment assembly to adjust a palm rest of the mouse;

DETAILED DESCRIPTION OF THE DISCLOSURE

Figure 1:
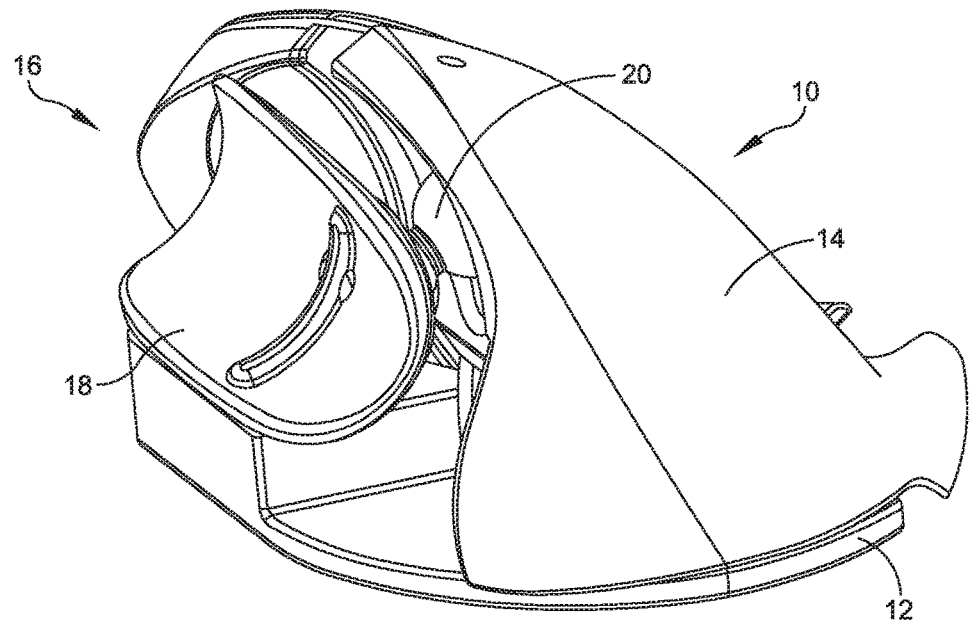
FIG. 1 is a perspective view of an adjustable mouse of an embodiment of the present disclosure, with a thumb adjustment assembly in a retracted position.

Aspects of the present disclosure are directed to a mouse that is configured to adjust a palm rest portion, a thumb rest portion, and locations of buttons of the mouse to better accommodate a user's hand. Thus, the mouse of embodiments of the present disclosure is capable of being adjusted to suit a size of a particular user's hand. In one embodiment, the mouse is capable of adjusting an angle of a body defining the palm rest portion of the mouse. Specifically, the mouse is adjustable at a base and a bottom of the palm rest portion of the mouse to keep a pivot point low and on an outside of the mouse. The palm rest portion and associated input controls pivot on an arc thereby making the mouse more ergonomically efficient for the user. For example, the adjustable mouse enables varying angle adjustments that a user can adjust to relieve stress on nerves and muscles that become too used or active when using a fixed angled mouse that was not correctly designed for their hand. The adjustable mouse is configured to relieve stress in a position initially found comfortable with the mouse, but is found to be uncomfortable after prolonged use made stress in other areas of the hand with previous adjustments.

Another aspect of the disclosure is directed to a mouse having a thumb adjustment assembly, which provides several axis of freedom of a user's thumb. In one embodiment, the thumb adjustment assembly includes a thumb rest portion and a threaded shaft that extends from the thumb rest portion. A gear assembly is associated with the base, and threadably connected to the threaded shaft to retract and extend the threaded shaft with respect to the base. In another embodiment, the thumb adjustment assembly includes a metal shaft that extends from the thumb rest portion, and a magnetic assembly associated with the base, with the magnetic assembly being configured to releasably secure the metal shaft in a desired position with respect to the base. In yet another embodiment, the thumb adjustment assembly includes a first telescopic shaft secured to the thumb rest portion by a universal ball joint, with the first telescopic shaft being supported by the base to move the thumb rest portion toward and away from the base. A second telescopic shaft may be provided to move the thumb rest portion frontwards and backwards with respect to the base. In a further embodiment, the thumb adjustment assembly includes a ball and socket connector with a long thumb rest portion for different sized thumbs. In a certain embodiment, an alternative thumb rest portion can be a smaller sized thumb rest portion that also has a sliding extension portion to make the thumb rest portion bigger (in addition to a double ball joint) and/or to readjust the positioning of the thumb rest portion. In particular, the thumb rest portion may embody two separate pieces which are attached by a hinge or a lever that allows a front piece to move with respect to a back piece, with the back piece being able to tilt up and down, and have the ability to tilt in other varying position.

The back piece is allowed to tilt up and down in any of a variety of positions by a ball joint, which can be substituted by a pivoting axis or a lever. The back piece of the thumb rest portion may be secured to an input control portion by a ball joint or the back piece may be secured to the base. The front piece of the thumb rest portion may attach to the back piece by a hinge that allows the front piece to change a curvature of the thumb rest portion itself by bending the front piece back and forth. In one embodiment, the back piece is attached to the base by the ball joint with a mechanism that allows telescoping in and out. In one embodiment, the thumb rest portion includes a small piece on the thumb rest portion that allows the thumb to hold the mouse better by positioning the thumb rest portion on the grip piece. The small piece is may be detached and a grip piece varying in size and thickness may be placed in its location for better comfort and mobility. In one embodiment, the grip piece can be placed in various locations on the thumb rest portion for better comfort and mobility instead of one location. The small piece allows for better control of the mouse as you are moving it by allowing the thumb to stretch in and out.

Another aspect of the disclosure is directed to a mouse having input control buttons that extend forward from the palm rest portion on an arc so that a user's fingers have a pitch (do not have to be straight) and length extension.

Other aspects of the mouse may include a flared surface at an outside bottom of the palm rest portion, an input control portion to keep the outside of the hand off of the surface of movement, a lip at a top of the mouse for carrying, a locking feature to lock a tilt angle of adjustment and to lock an extension of the input control buttons along the arc.

Referring now to the drawings, and more particularly to FIGS. 1-6, an embodiment of an adjustable mouse is generally indicated at 10. As shown, the mouse 10 is configured for a user's right hand. It should be understood that the mouse 10 may be configured for a user's left hand and still fall within the scope of the present disclosure. As mentioned above, the mouse 10 is configured to control the motion of a pointer in two dimensions in a GUI, with the mouse converting the movements of the user's hand into equivalent electronic signals to move the pointer in the traditional manner. As will be discussed in greater detail below, buttons are provided on the mouse, which may be "clicked" to perform certain actions by the user.

Figure 2:
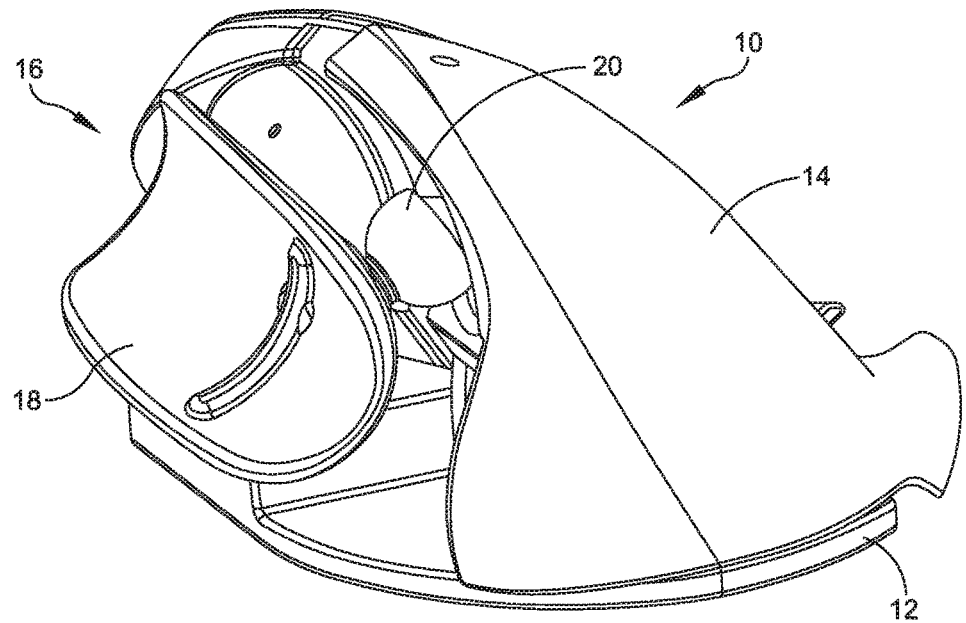
FIG. 2 is a perspective view of the mouse, with the thumb adjustment assembly in an extended position.

FIGS. 1 and 2 illustrate the mouse 10 having a base 12, an internal frame structure (not shown) secured to the base, and a palm rest portion 14 that is form fitting to the user's hand. As shown, the mouse 10 further includes a thumb adjustment assembly generally indicated at 16 that is configured to move a two-piece thumb rest portion 18 between a retracted position illustrated in FIG. 1 and an extended position illustrated in FIG. 2. As will be described in greater detail below with reference to FIGS. 7-12, the two-piece thumb rest portion 18 is connected to the internal frame structure of the base 12 by a ball and socket connector 20, which is configured to extend and retract the thumb rest portion.

Figure 3:
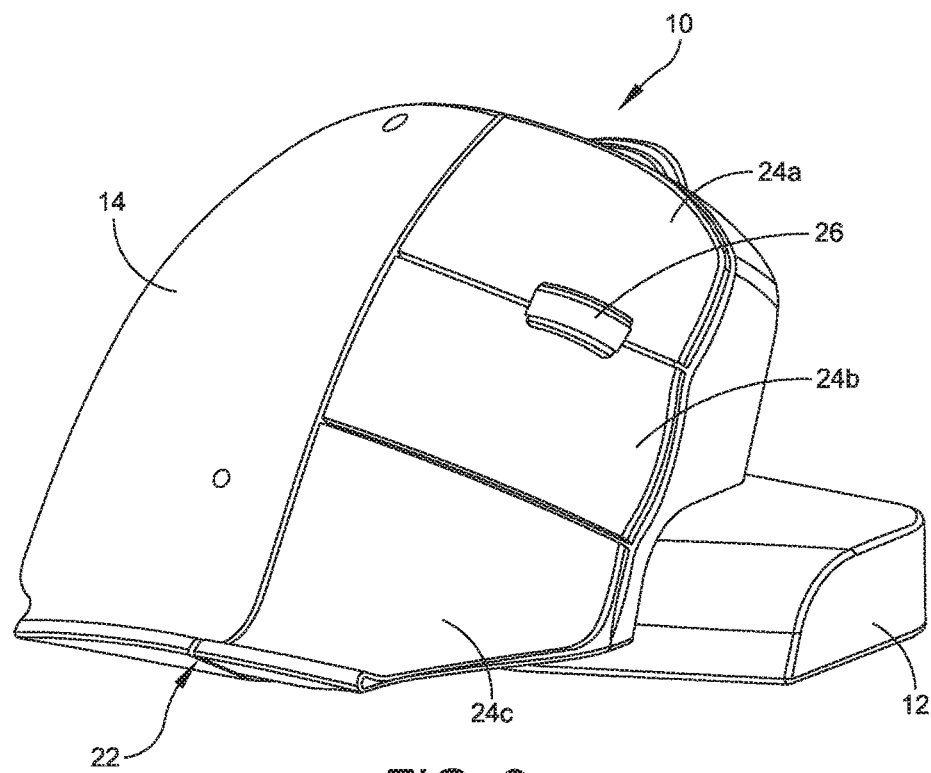
FIG. 3 is a perspective view of the mouse, with a base adjustment assembly in a neutral position for input control.
Figure 4:
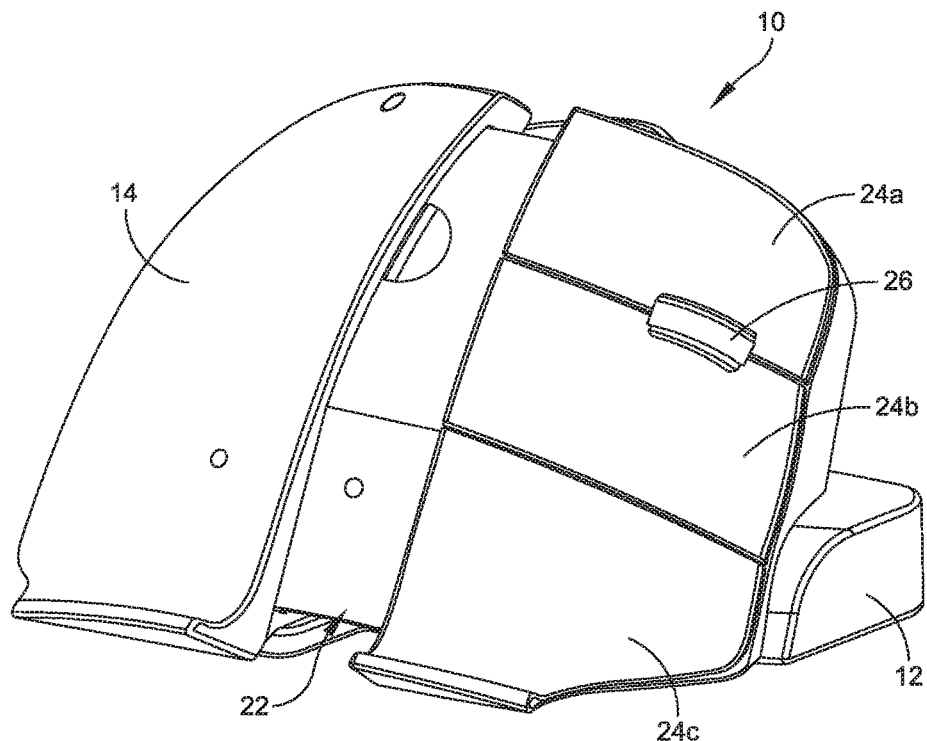
FIG. 4 is a perspective view of the mouse, with the base adjustment assembly in an extended position for input control.

FIGS. 3 and 4 illustrate the mouse 10 having a base adjustment assembly, generally indicated at 22, provided adjacent the palm rest portion 14 to adjust a position of finger buttons, illustrated at 24a, 24b and 24c. The base adjustment assembly 22 may also be referred to as a finger adjustment assembly. The base adjustment assembly 22 of mouse 10 is designed to extend the finger buttons 24a, 24b and 24c away from the palm rest portion 14 to accommodate operators having larger hands. FIG. 3 illustrates the base adjustment assembly 22 of the mouse 10 in a neutral position for input control for person's having smaller hands. FIG. 4 illustrates the base adjustment assembly 22 of the mouse 10 in an extended position for input control for person's having larger hands and/or fingers. The finger buttons 24a, 24b and 24c are designed to be manipulated by the user's fore, index and ring fingers, respectively, with a wheel 26 provided between the finger buttons 24a, 24b manipulated by the fore and index fingers. It should be understood that although three finger buttons 24a, 24b and 24c are provided for mouse 10, a mouse having less (e.g., two) or more (e.g., four) finger buttons, or without a wheel, may be provided. As shown, the base adjustment assembly 22 extends the finger buttons 24a, 24b and 24c along an arc to conform to the operator's hand.

Figure 5:
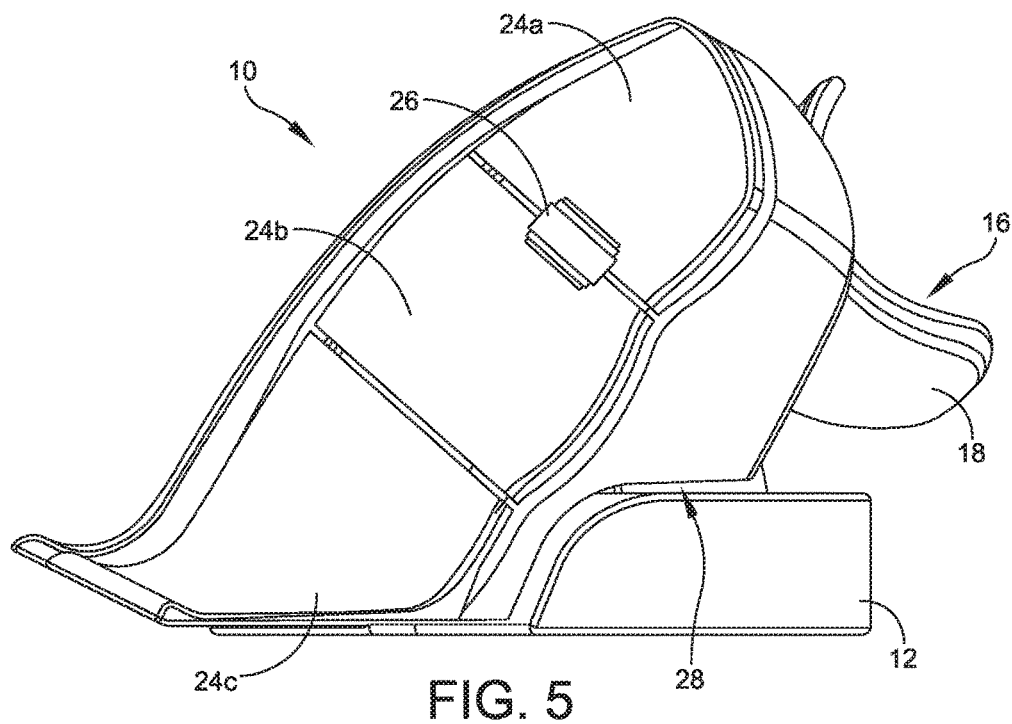
FIG. 5 is a perspective view of the mouse, with a height adjustment assembly in a neutral position.
Figure 6:
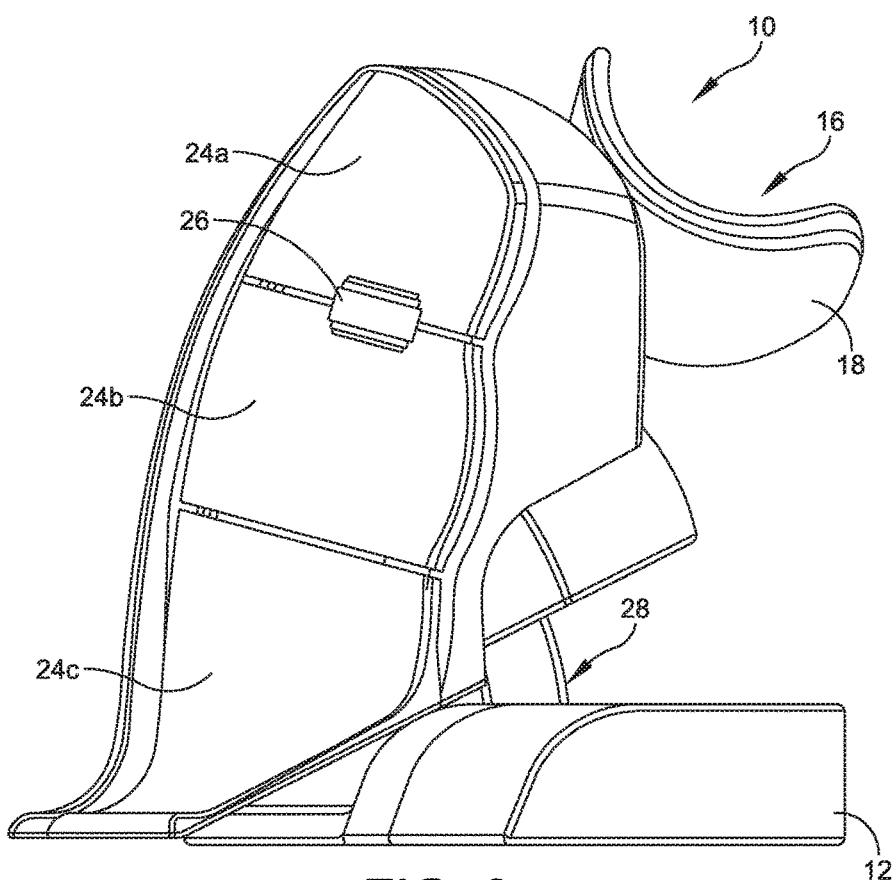
FIG. 6 is a perspective view of the mouse, with the height adjustment assembly in a raised, tilt position.

FIGS. 5 and 6 illustrate the mouse 10 having a height adjustment assembly, generally indicated at 28, to raise the height of the palm rest portion 14 and the finger buttons 24a, 24b and 24c with respect to the base 12 and to tilt the position of these components. FIG. 5 illustrates the height adjustment assembly 28 of the mouse 10 in a neutral position in which the palm rest portion 14 and the finger buttons 24a, 24b and 24c are disposed adjacent the base 12 of the mouse. FIG. 6 illustrates the height adjustment assembly 28 of the mouse 10 in a raised, tilt position in which the palm rest portion 14 and the finger buttons 24a, 24b and 24c are raised and tilted with respect to the base 12.

Figure 7:
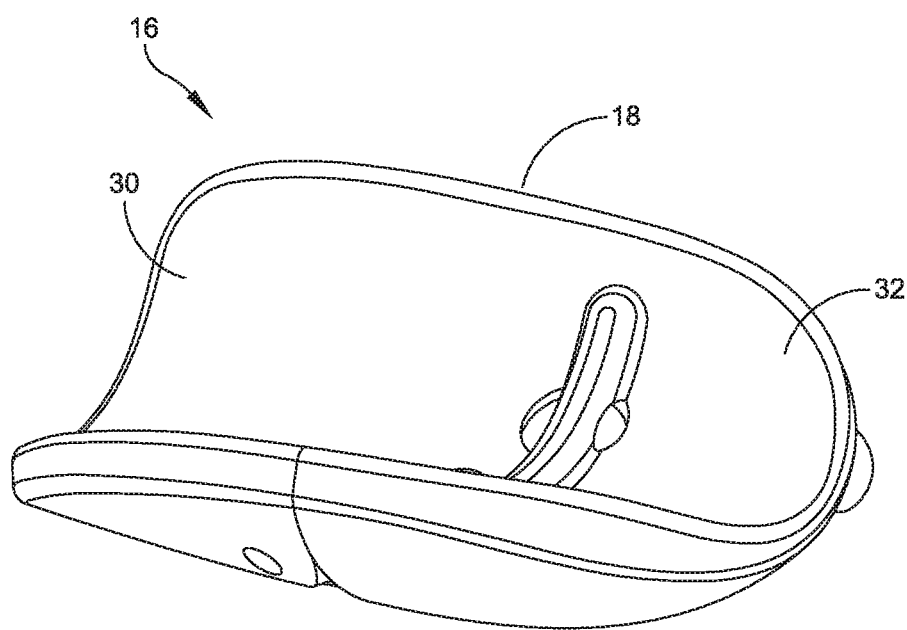
FIG. 7 is a perspective view of a two-piece portion of the thumb adjustment assembly.
Figure 8:
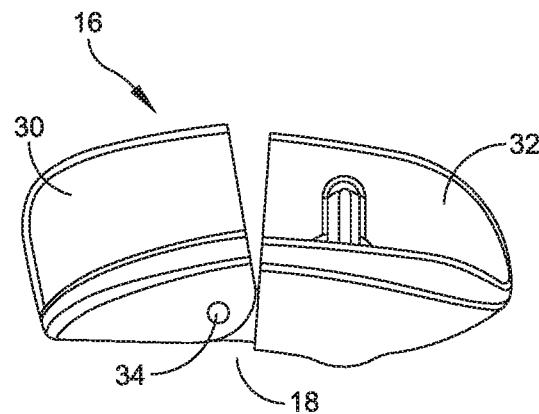
FIG. 8 is a perspective view of the two-piece portion of the thumb adjustment assembly shown in FIG. 7 pivoting about a hinge.

Turning now to FIGS. 7-12, the construction of one embodiment of the thumb adjustment assembly 16 will be described in greater detail. FIGS. 7 and 8 illustrate the two-piece thumb rest portion 18 of the thumb adjustment assembly 16 having a two separate pieces 30, 32 which are attached by a hinge 34 that allows the front piece 30 to move with respect to the back piece 32, with the back piece being able to tilt up and down to achieve any of a variety of positions. The back piece 32 is allowed to tilt up and down by the ball and socket connector 20, which can be substituted by a pivoting axis or a lever. The back piece 32 of the thumb rest portion 18 may be secured to an input control portion by the ball and socket connector 20 or the back piece may be secured to the base 12.

As shown in FIG. 8, the front piece 30 of the thumb rest portion 18 may attach to the back piece 32 by the hinge 34, which allows the front piece to change a curvature of the thumb rest portion itself by bending the front piece back and forth. The back piece 32 is attached to the base 12 by the ball and socket connector 20 with a mechanism that allows telescoping in and out. In one embodiment, the thumb adjustment assembly 16 is configured to lock in a desired extended position to lock the thumb rest portion 18 in place. In a certain embodiment, the thumb rest portion 18 can be locked in place by a dedicated locking mechanism or by friction associated with the mechanism that allows the thumb rest portion to extend in and out. The thumb adjustment assembly 16 can be further configured to lock the front piece 30 and the back piece 32 in a desired position with respect to each other.

In another embodiment, a small piece of the thumb rest portion allows the thumb to hold the mouse better by positioning the thumb rest portion on the grip piece. The small piece may be detached and a grip piece varying in size and thickness may be placed in its location for better comfort and mobility. For example, the grip piece can be placed in various locations on the thumb rest for better comfort and mobility. The small piece allows for better control of the mouse as the mouse is moved by allowing the thumb to stretch in and out.

Figure 9:
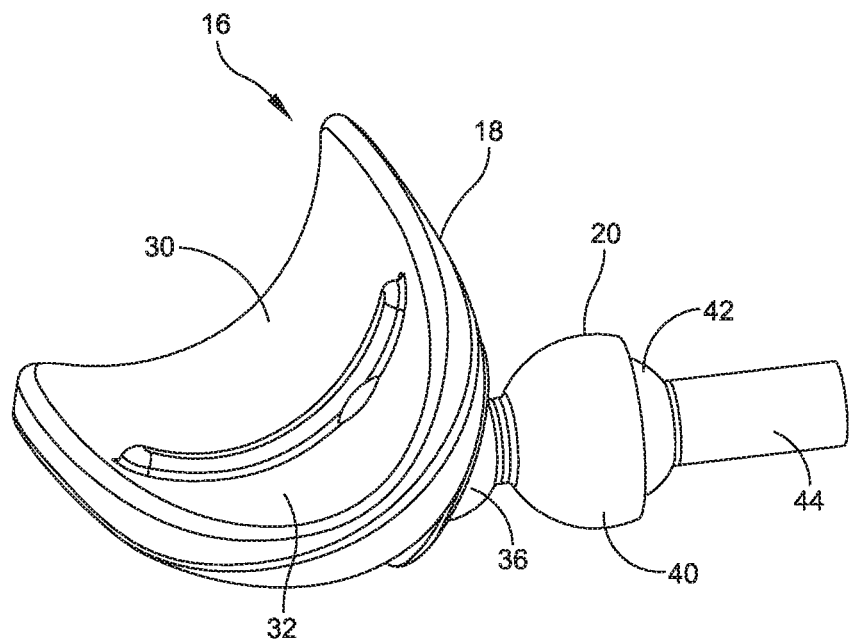
FIG. 9 is a perspective view of a ball and socket connector secured to the two-piece portion of the thumb adjustment mechanism.
Figure 10:
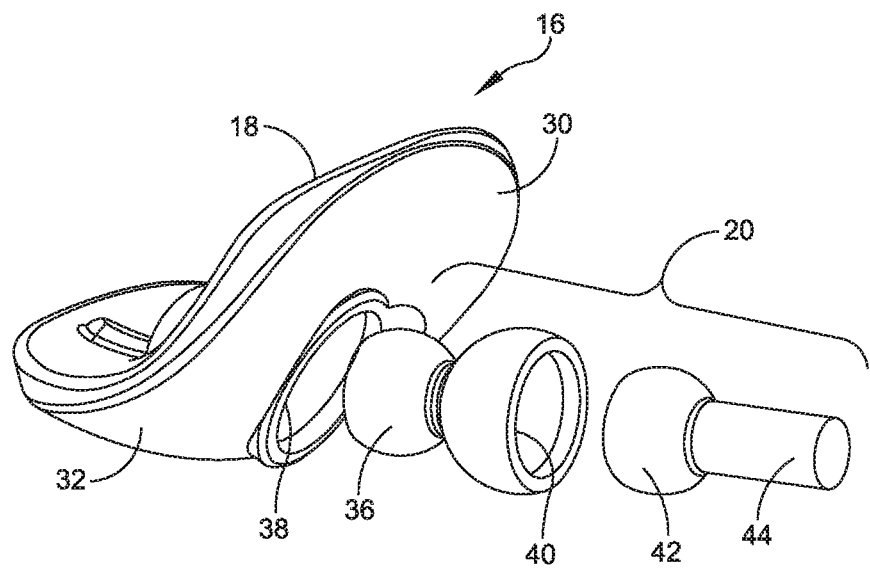
FIG. 10 is an exploded perspective view of the two-piece portion and the ball and socket connector.

FIGS. 9 and 10 illustrate the back piece 32 connected to the ball and socket connector 20. As shown, the ball and socket connector 20 includes a head portion 36 that is received within a receptacle 38 formed in the back piece 32 of the thumb adjustment assembly 16. The ball and socket connector 20 further includes a receptacle 40 that is configured to receive a head portion 42 attached to a stem 44. In one embodiment, the stem 44 is attached a telescoping mechanism associated with the frame structure of the base 12 of the mouse 10 to move the stem, the ball and socket connector 20, and the back piece 32 from the retracted position to extended position. As mentioned above, the back piece 32 is configured to lock in a desired extended position. For example, the ball and socket connector 20 is configured to inherently lock the back piece 32 of the thumb rest portion 18 when extended to the extended position to lock the thumb rest portion in place. The front piece 30 may be configured to lock in a similar manner as well. Any number of mechanisms may be included to lock the thumb adjustment assembly 16.

Figure 11:
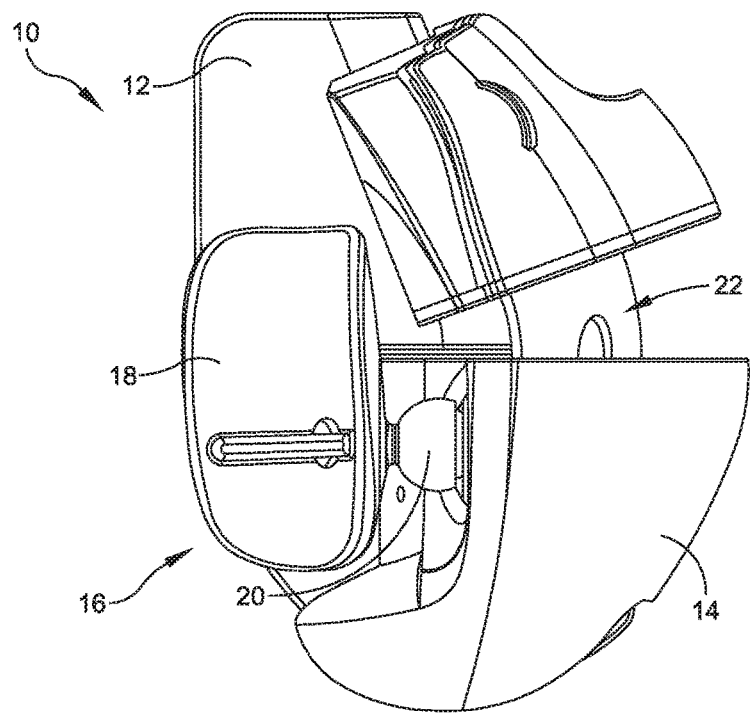
FIG. 11 is a top plan view of the mouse showing aspects of the two-piece portion and the ball and socket connector of the thumb adjustment assembly.
Figure 12:
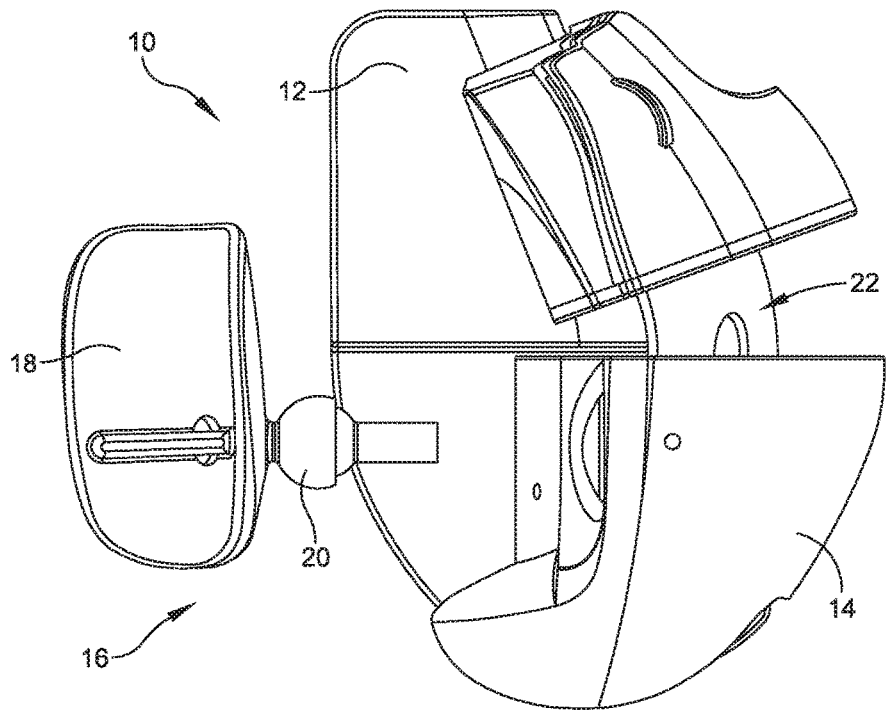
FIG. 12 is an exploded top plan view of the mouse showing aspects of the two-piece portion and the ball and socket connector of the thumb adjustment assembly.

FIGS. 11 and 12 illustrate the construction of the thumb adjustment assembly 16 and the base adjustment assembly 22. FIG. 11 illustrates the thumb adjustment assembly 16 and the base adjustment assembly 22 in extended positions, with FIG. 12 showing the thumb adjustment assembly 16 disassembled from the base 12 of the mouse 10. As shown, the base adjustment assembly 22 extends the finger buttons 24a, 24b and 24c away from the palm rest portion 14 in a generally arcuate direction with respect to the base 12. In one embodiment, the base adjustment assembly 22 is configured to lock the finger buttons 24a, 24b and 24c in a desired extended position. For example, the component parts constituting the base adjustment assembly 22 may include interference fit connectors that inherently lock the assembly in a desired position.

Figure 13:
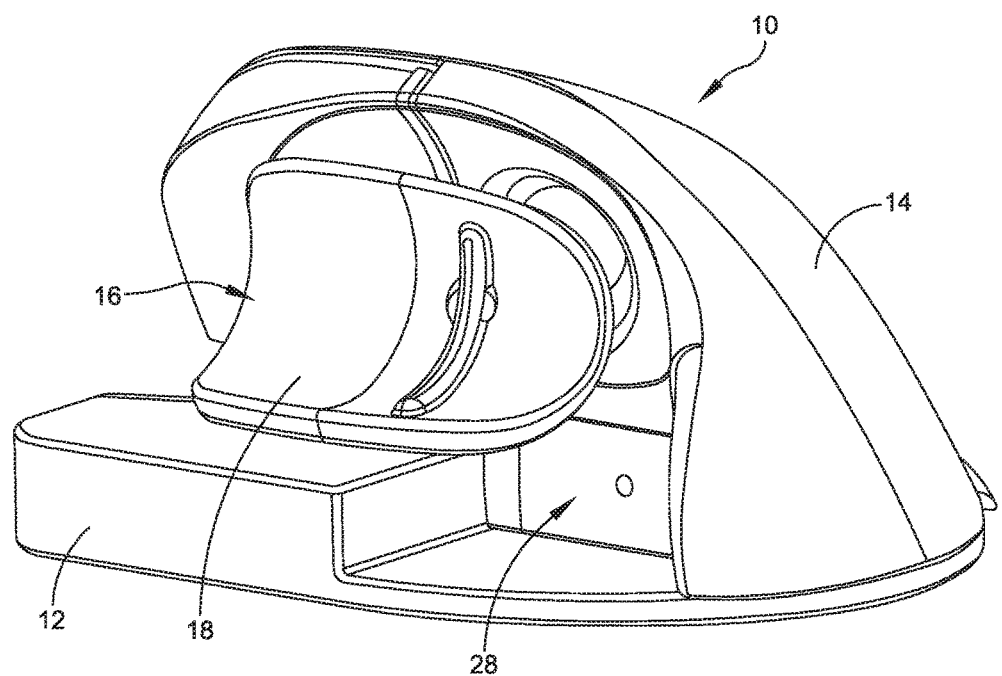
FIG. 13 is a perspective view of the mouse showing the height adjustment assembly in the neutral position.
Figure 14:
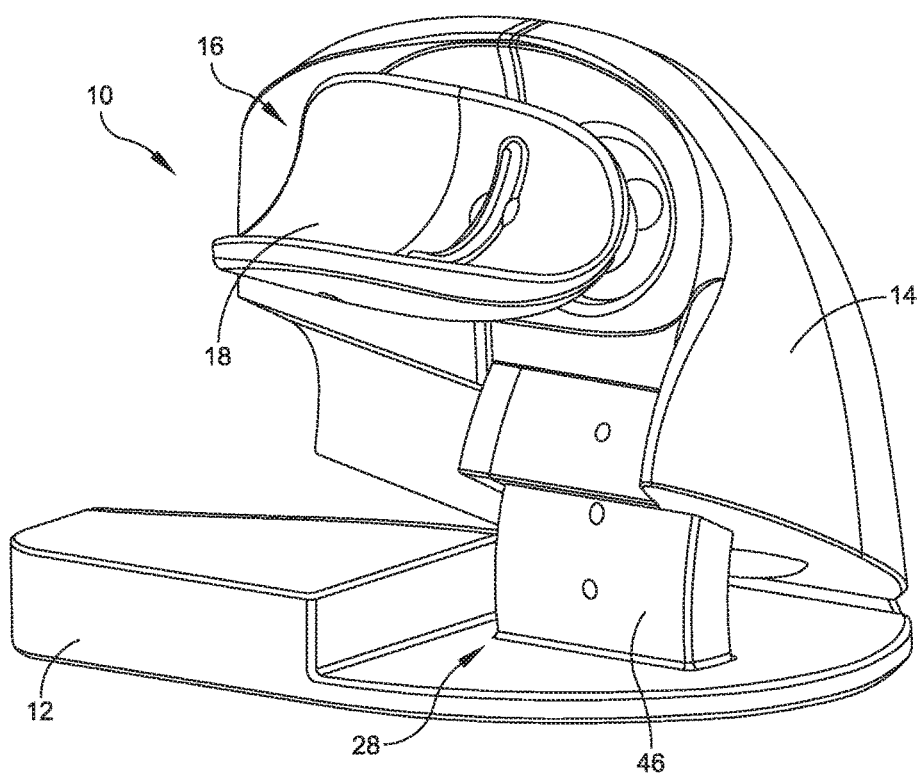
FIG. 14 is a perspective view of the mouse showing the height adjustment assembly in the raised, tilt position.

FIGS. 13 and 14 illustrate the construction of the height adjustment assembly 28. FIG. 13 shows the palm rest portion 14 and the finger buttons 24a, 24b and 24c in a neutral or lowered position. FIG. 14 shows the palm rest portion 14 and the finger buttons 24a, 24b and 24c in a raised, tilted position. As shown, the base 12 includes a support member 46 on which the palm rest portion 14 and the finger buttons 24a, 24b and 24c are connected. In one embodiment, the height adjustment assembly 28 is configured to lock the palm rest portion 14 and the finger buttons 24a, 24b and 24c in a raised and tilted position with respect to the support member 46. For example, the component parts constituting the height adjustment assembly 28, including the support member 46, may include interference fit connectors that inherently lock the assembly in a desired position with respect to the support member 46.

Figure 15:
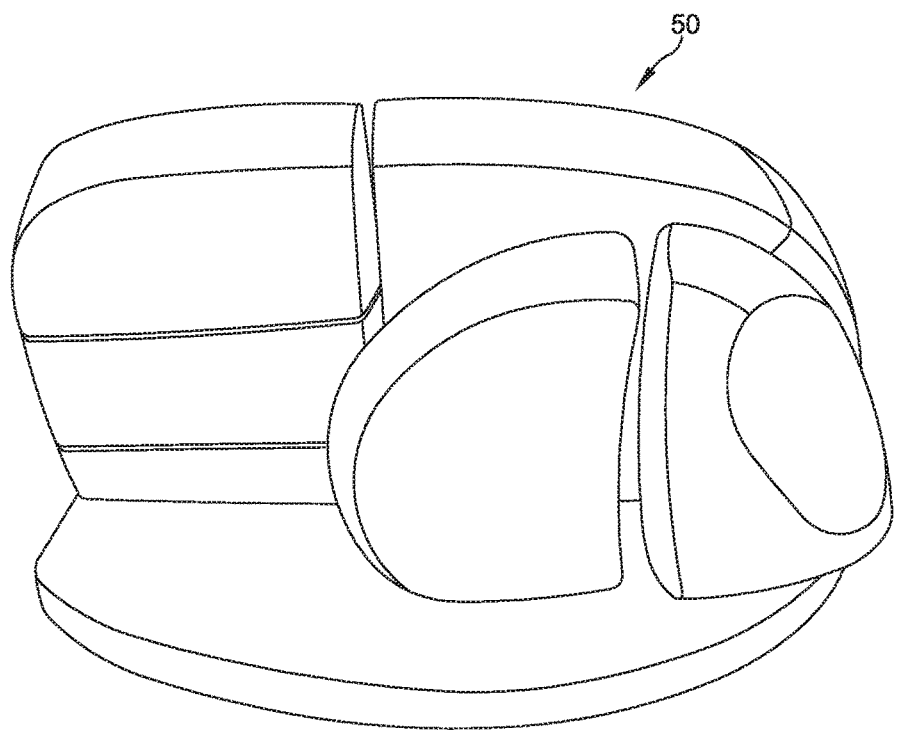
FIGS. 15 and 16 are perspective views of a model of an adjustable mouse of another embodiment of the disclosure.
Figure 16:
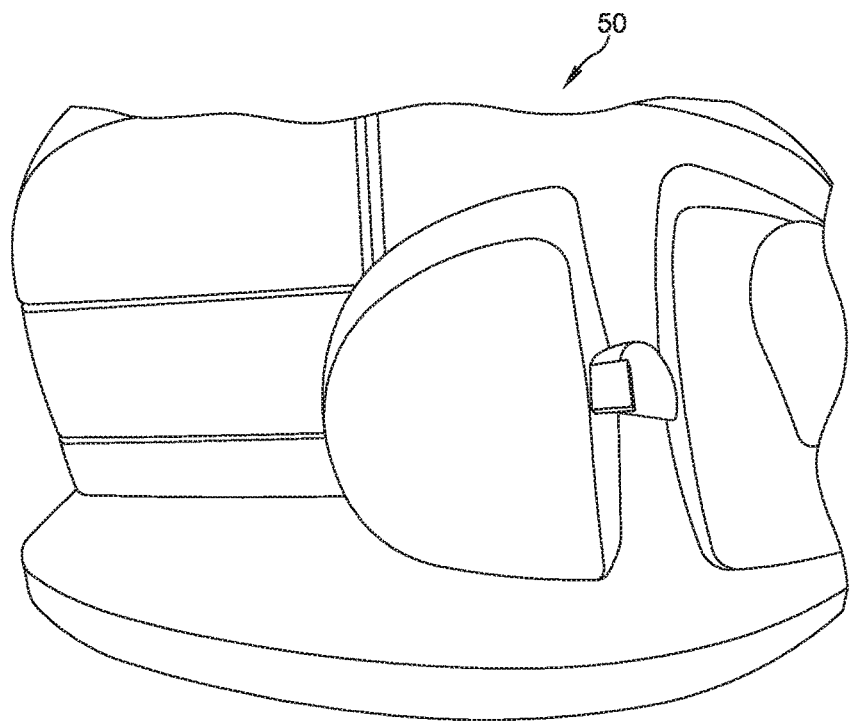
Figure 18:
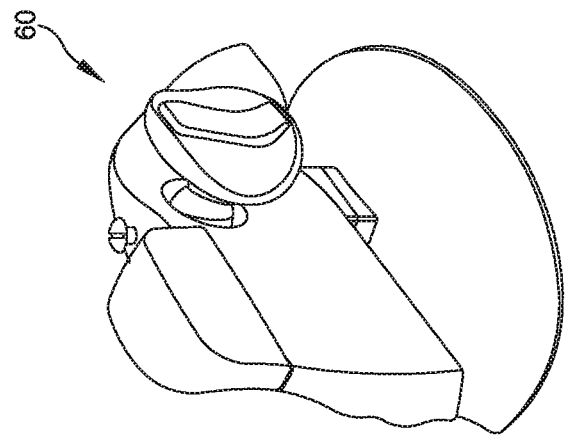
FIGS. 17-26 are perspective views of an adjustable mouse of another embodiment of the disclosure.
Figure 17:
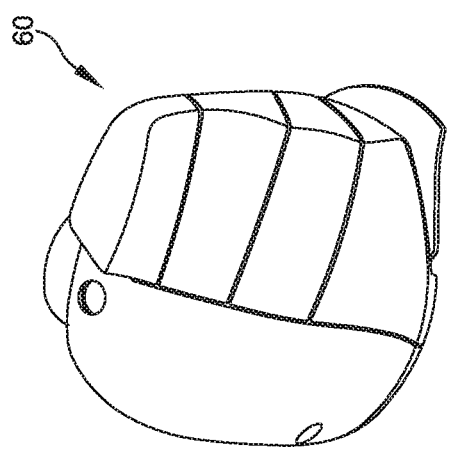
Figure 20:
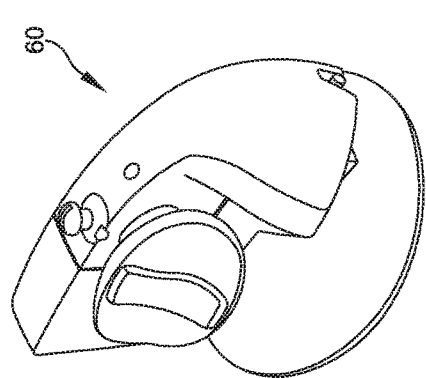
Figure 22:
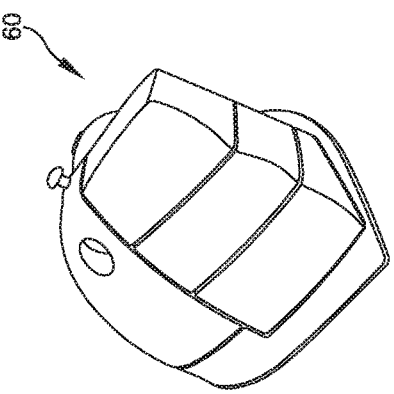
Figure 19:
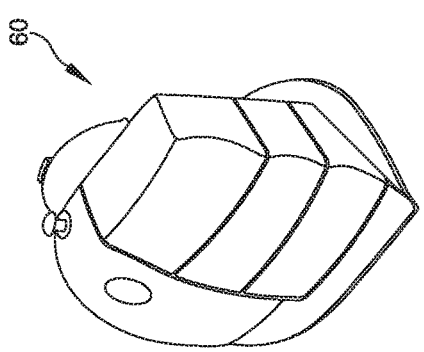
Figure 21:
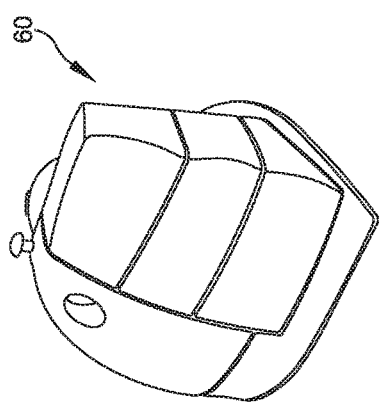
Figure 24:
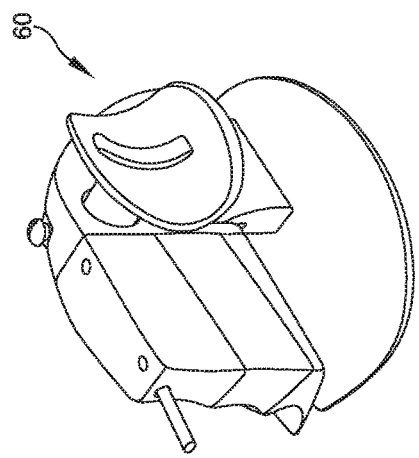
Figure 26:
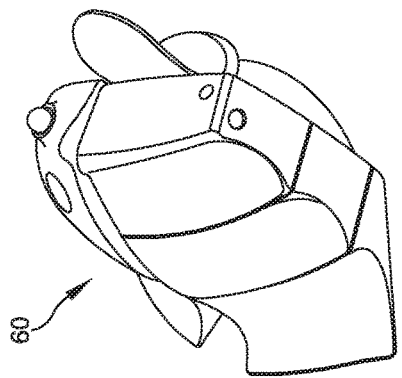
Figure 23:
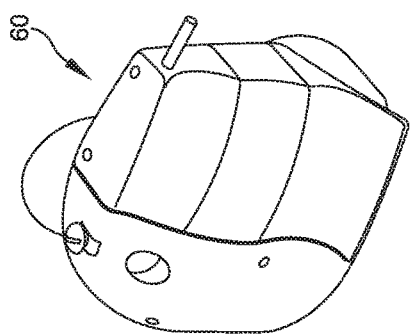
Figure 25:
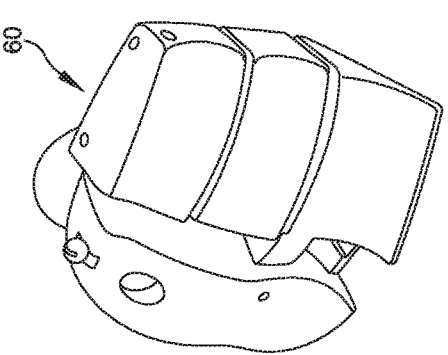

FIGS. 15 and 16 illustrate an alternate embodiment of the present disclosure of a mouse, generally indicated at 50, having a thumb adjustment assembly. As shown, the mouse 50 includes a split thumb rest portion adjustment feature.

FIGS. 17-26 illustrate a mouse, generally indicated at 60, of another embodiment of the present disclosure. As shown, the mouse 60 includes a feature to adjust a position of input control fingers along an arc. Also, the input control fingers may be configured to be spread apart with respect to one another.

Figure 27A:
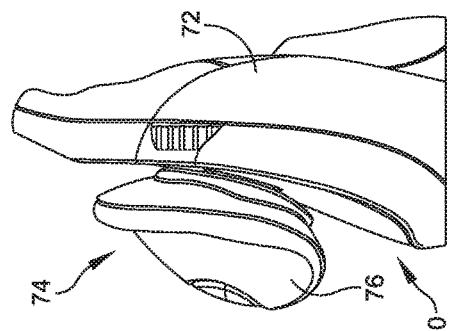
FIGS. 27A and 27B are top plan views of an adjustable mouse of another embodiment of the present disclosure, with a thumb adjustment assembly in a retracted position (FIG. 27A) and an extended position (FIG. 27B)
Figure 27B:
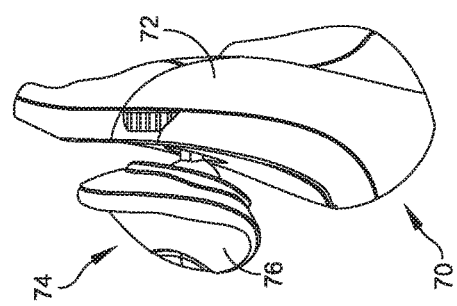

Referring to FIGS. 27A and 27B, an embodiment of an adjustable mouse is generally indicated at 70. As shown, the mouse 70 is configured for a user's right hand; however, it should be understood that the mouse may be configured for a user's left hand instead. As with the other embodiments, the mouse 70 is configured to control the motion of a pointer in two dimensions in a GUI, with the mouse converting the movements of the user's hand into equivalent electronic signals to move the pointer in the traditional manner. The mouse 70 has a base 72 with an integrated palm rest portion that is form fitting to the user's hand. The mouse 70 further includes a thumb adjustment assembly generally indicated at 74 that is configured to move a thumb rest portion 76 between a retracted position illustrated in FIG. 27A and an extended position illustrated in FIG. 27B by a gear assembly described in greater detail below. In certain embodiments, the thumb rest portion 76 can embody the two-part thumb rest portion described above, and can include a thumb ridge to manipulate the movement of the thumb rest portion.

Figure 28:
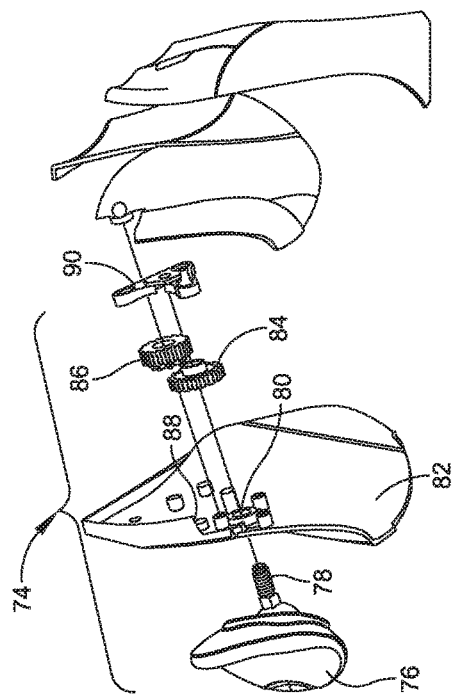
FIG. 28 is an exploded perspective view of the thumb adjustment assembly shown in FIGS. 27A and 27B.
Figure 29A:
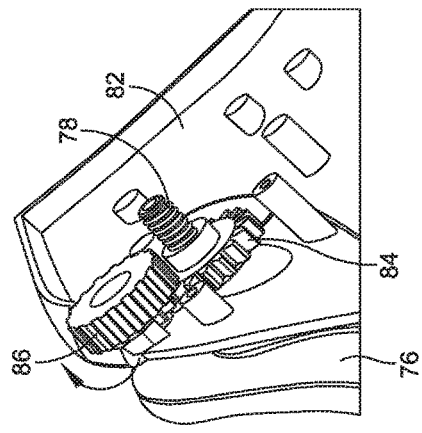
FIGS. 29A and 29B are perspective views with portions removed showing the thumb adjustment assembly in the retracted position (FIG. 29A) and the extended position (FIG. 29B)
Figure 29B:
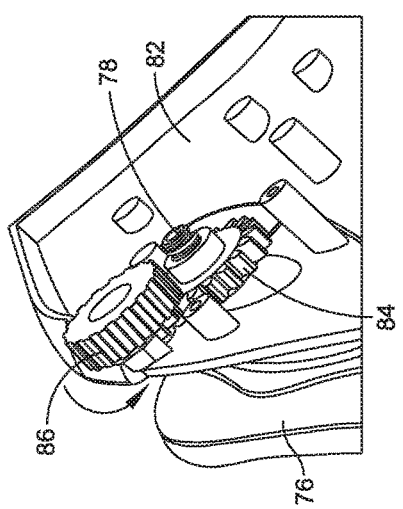

Referring additionally to FIGS. 28, 29A and 29B, the construction of the thumb adjustment assembly 74 will be described in greater detail. As shown, the thumb rest portion 76 includes a threaded shaft 78 that extends from a body of the thumb rest portion. The threaded shaft 78 extends through an opening 80 formed in a base cover portion 82 of the base 72, and is threadably connected to a first gear 84. A second gear 86, which is accessible through another opening 88 formed in the base cover portion 82, meshes with the first gear 84 to drive the movement of the first gear when manipulated by a user's thumb, for example. The gear assembly includes a gear housing 90 that secures the first and second gear 84, 86 to an inner surface of the base cover portion 82 and the remainder of the base cover.

During operation, FIG. 29A represents the thumb rest portion 76 in the retracted position. The rotation of the second gear 86 by the user's thumb causes the rotation of the first gear 84, which in turn rotates the threaded shaft 78 of the thumb rest portion 76 outboard with respect to the base 72. This movement causes the thumb rest portion 76 to achieve the extended portion represented in FIG. 29B. The movement is easily achieved by the user by rotating the second gear 86 in a manner similar to the rotation of the scroll wheel described above.

Referring to FIG. 30, another embodiment of an adjustable mouse is generally indicated at 100. As shown, the mouse 100 has a base 102 with an integrated palm rest portion that is form fitting to the user's hand. The mouse 100 further includes a thumb adjustment assembly generally indicated at 104 that is configured to move a thumb rest portion 106 between a retracted position illustrated in FIG. 31A and an extended position illustrated in FIG. 31B by a magnetic assembly described in greater detail below.

Referring additionally to FIG. 32, the construction of the thumb adjustment assembly 104 will be described in greater detail. As shown, the thumb rest portion 106 includes a metal shaft 108 that extends from a body of the thumb rest portion. The metal shaft 108 extends through an opening 110 formed in a base cover portion 112 of the base 102, and is received by a magnetic assembly having a magnet housing 114 and two magnets, each indicated at 116, supported by the magnet housing. The magnet housing 114 and the magnets 116 are held in place on the metal shaft by an e-ring 118 designed to clip onto an end of the metal shaft 108.

During operation, once the magnets 116 are slid axially into the magnet housing 114, the magnets and the metal shaft 108 attach to each other to produce a large static friction force. The user can manipulate the thumb rest portion 106 by axially moving the thumb rest portion with a larger force than the friction force applied by the magnets 116 to the metal shaft 108 of the thumb rest portion. Once the user selects a desired extension of the thumb rest portion 106, the friction force maintains the thumb rest portion at the desired extension. As mentioned, FIG. 31A represents the thumb rest portion 106 in the retracted position. The movement of the user applied to the thumb rest portion 106 can achieve the extended portion represented in FIG. 31B.

FIGS. 33A, 33B, 34A and 34B illustrate another embodiment of the thumb adjustment assembly, generally indicated at 130. As shown, the thumb adjustment assembly 130 includes a thumb rest portion 132 that is secured to a first telescopic shaft 134 by a universal ball joint 136. The first telescopic shaft 134 is supported by a base 138, and can be used to position the thumb rest portion 132 in a retracted position FIGS. 33A and 33B) or in an extended position (FIGS. 34A and 34B) away from the base. In one embodiment, the first telescopic shaft 134 can move the thumb rest portion 132 approximately six millimeters (mm). The thumb adjustment assembly 130 further can include a second telescopic shaft 140 supported by the base 138 to move the thumb rest portion 132 frontwards and backwards. FIG. 33B illustrates the thumb rest portion 132 in a rearward position. FIG. 34B illustrates the thumb rest portion 132 in a forward position. In one embodiment, the second telescopic shaft 140 can move the thumb rest portion approximately seven mm. In certain embodiments, the first telescopic shaft 134 and the second telescopic shaft 140 can be manipulated to change an angle of the thumb rest portion 132 with respect to the base 138 to accommodate the user's hand.

FIGS. 35A, 35B, 36A and 36B illustrate another embodiment of the thumb adjustment assembly, generally indicated at 1300, which is constructed similarly to the thumb adjustment assembly 130 shown in FIGS. 33A, 33B, 34A and 34B. As shown, the thumb adjustment assembly 1300 includes a thumb rest portion 1320 that is secured to a telescopic shaft 1340 by a universal ball joint 1360. The telescopic shaft 1340 is supported by a base 1380, and can be used to position the thumb rest portion 1320 in a retracted position FIGS. 35A and 35B) or in an extended position (FIGS. 36A and 36B) away from the base. In one embodiment, the telescopic shaft 1340 can move the thumb rest portion 1320 approximately six millimeters (mm). In the shown embodiment, the telescopic shaft 1340 is pivotally connected to the base 1380 by a pivot post 1400. As shown, the pivot post 1400 extends vertically from the base. FIG. 35B illustrates the thumb rest portion 1320 in a position in which the telescopic shaft 1340 extends from the pivot post 1400 in a direction generally normal or perpendicular to the direction of the base 1380. FIG. 36B illustrates the thumb rest portion 1320 in a forward press position in which the telescopic shaft 1340 extends from the pivot post 1400 in a forward pivoted direction. In certain embodiments, the telescopic shaft 1340 can be manipulated to change an angle of the thumb rest portion 1320 with respect to the base 1380 to accommodate the user's hand.

With the multiple embodiments of the thumb adjustment assembly disclosed herein a single ball joint can be used for simplicity to allow a user to move the thumb rest portion in an ergonomically comfortable position. A single ball joint can achieve the desired result of a double ball joint with respect to extending the thumb rest portion. The added benefit of the double ball joint is allowing the thumb rest portion to be fixed in a position while allowing the thumb rest portion to move up or down. This is possible because of the rod connecting the first and the second ball joint creates another arm that an angle of the respective portions. A double ball joint can further be used to enable the thumb rest portion to be moved clockwise, counterclockwise, and tilt in multiple directions. The thumb adjustment assembly may be used to move the thumb rest portion toward or away from the adjustable mouse body thereby accommodating the particular characteristics of the user's hand. The embodiments disclosed herein are designed to allow a user's hand to expand by allowing the thumb to be moved farther away from the remainder of the hand. This relieves cramping and/or pain associated with mice that are too small for the users' hands. The thumb adjustment assembly enables the user to position the thumb rest portion at a desired position away from the base of the adjustable mouse.

Referring to FIGS. 37A, 37B and 37C, an adjustable mouse is generally indicated at 150. As shown, the adjustable mouse 150 includes a base portion 152 and a palm rest portion 154 hingedly attached to the base portion by a hinge 156 at an outer edge of the base portion. In one embodiment, the hinge 150 has sufficient friction to position the palm rest portion 154 at a desired angle with respect to the base portion 152 in a stable position. In a certain embodiment, the hinge 156 is a piano-type hinge, which can also be referred to as a long hinge. The user can select a desired angle by pivoting the palm rest portion 154 with respect to the base portion 152, allowing the friction of the hinge 156 to maintain the palm rest portion in the desired position. The construction of the palm rest portion may embody any of the designs of the palm rest portions disclosed herein.

FIGS. 38A, 38B and 38C illustrate an adjustable mouse, generally indicated at 160, which is similarly constructed as adjustable mouse 150. As shown, the adjustable mouse 160 includes a base portion 162 and a palm rest portion 164 hingedly attached to the base portion by a hinge 166 positioned inwardly from an outer edge 168 of the base portion. The palm rest portion 164 includes internal curved rails 170 to guide the hinge 166 and to direct the angle adjustment of the palm rest portion with respect to the base portion 162. The hinge 166 has sufficient friction to position the palm rest portion at a desired angle in a stable position. The user can select a desired angle by pivoting the palm rest portion 164 with respect to the base portion 162, allowing the friction of the hinge 166 to maintain the palm rest portion in the desired position.

Figure 39:
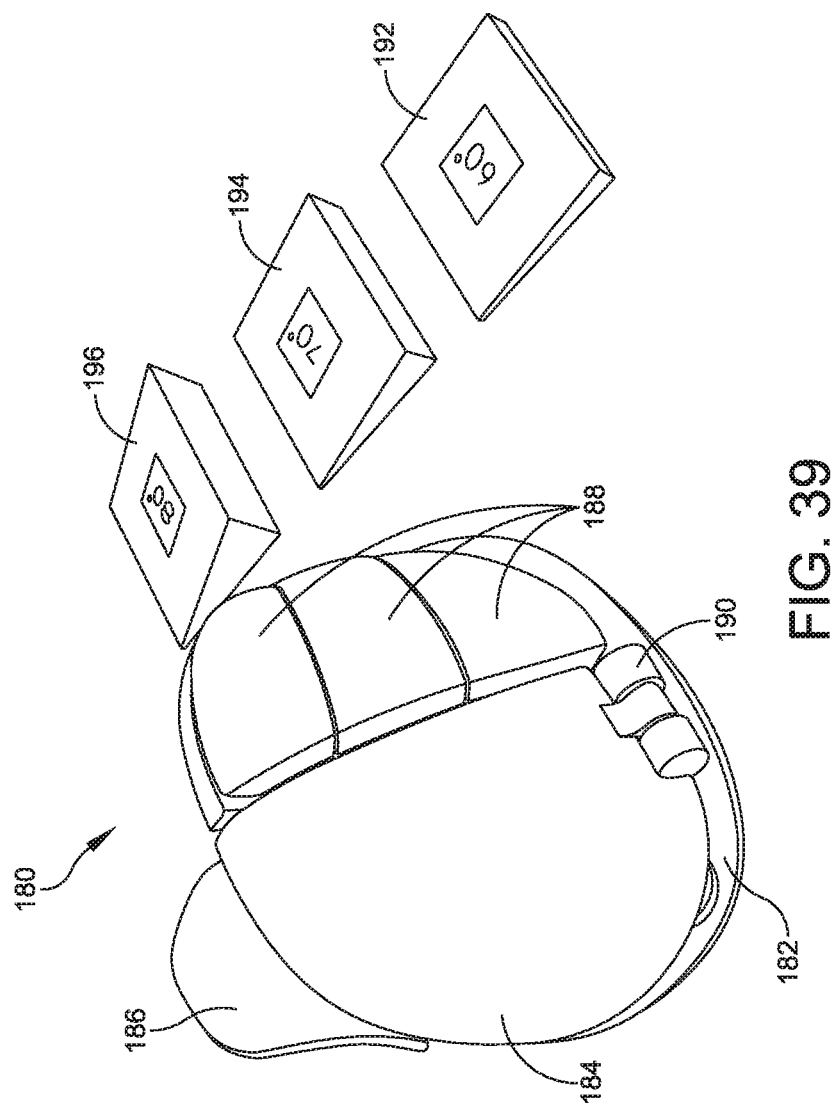
FIG. 39 is a perspective view of an adjustable mouse of another embodiment of the present disclosure showing wedge portions used to adjust an angle of a palm rest portion of the adjustable mouse.

Referring to FIG. 39, an adjustable mouse of another embodiment is generally indicated at 180. As shown, the adjustable mouse 180 includes a base portion 182 and a palm rest portion 184 having a thumb rest portion 186 and finger portions, each indicated at 188. The palm rest portion 184 is hingedly connected to the base portion 182 by a hinge 190 at an outer edge of the base portion. The palm rest portion 184 can be angled or tilted with respect to the base portion 182 by one of three wedges 192, 194, 196 illustrated in FIG. 39. In one embodiment, the wedges 192, 194, 196 can be used to vary an angle or tilt of the palm rest portion with respect to the base portion of the adjustable mouse, e.g., a 10-degree, 20-degree or 30-degree angle with respect to a vertical axis.

Figure 40:
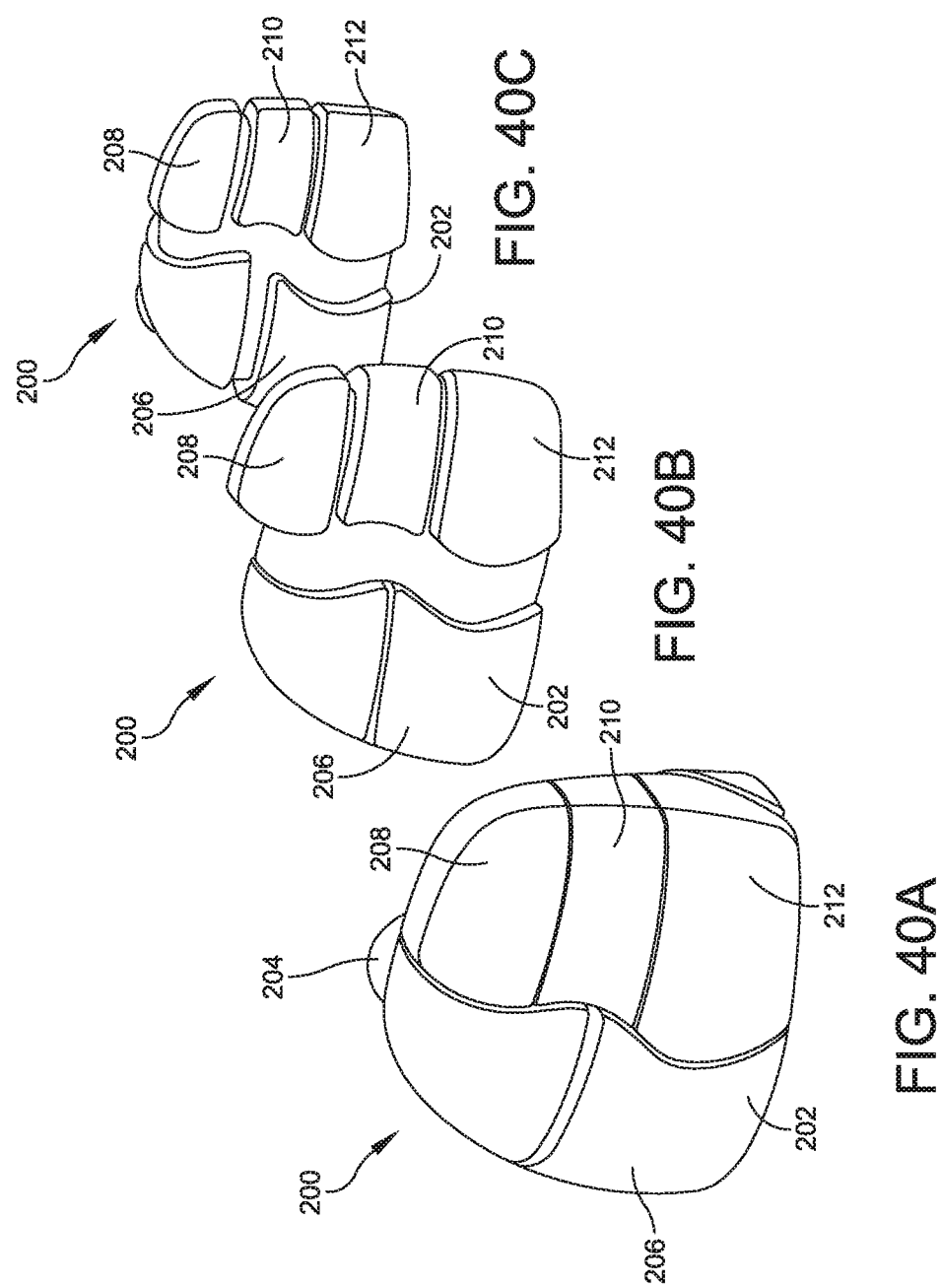
FIGS. 40A, 40B and 40C are perspective views of an adjustable mouse of another embodiment of the present disclosure showing finger extensions in a retracted position (FIG. 46A, a partially extended position (FIG. 46B) and a fully extended position (FIG. 46C)
Figure 41:
FIGS. 41-47 are perspective views of an adjustable mouse of another embodiment of the disclosure.
Figure 42:
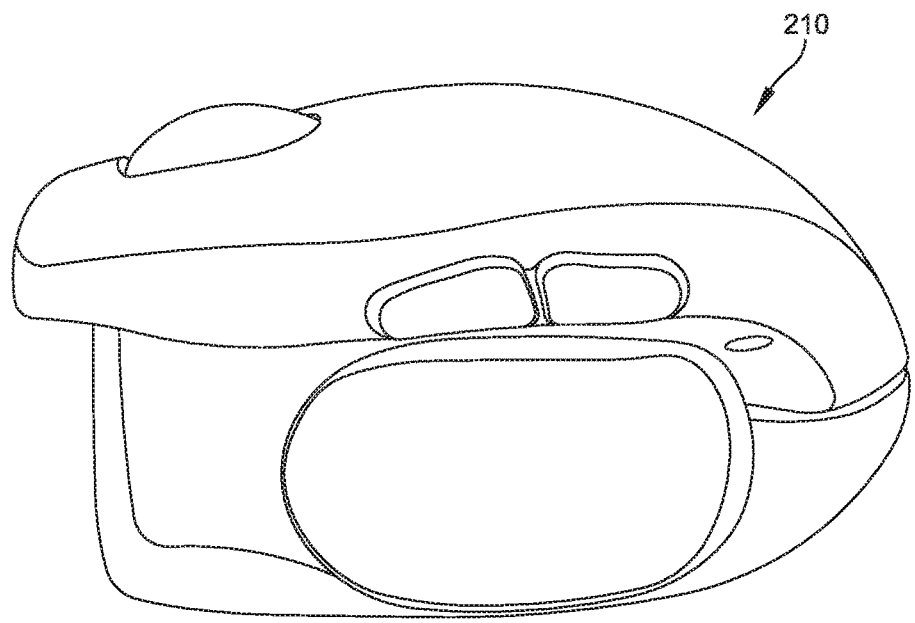
Figure 43:
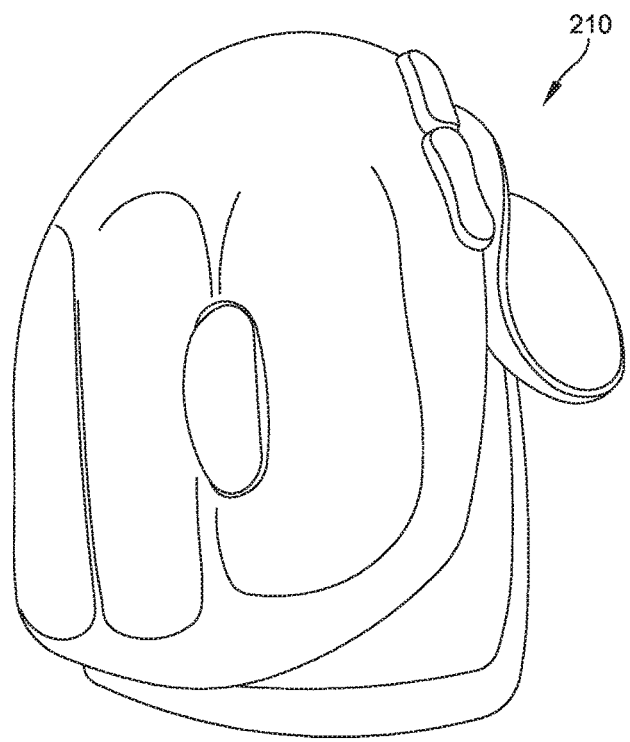
Figure 44:
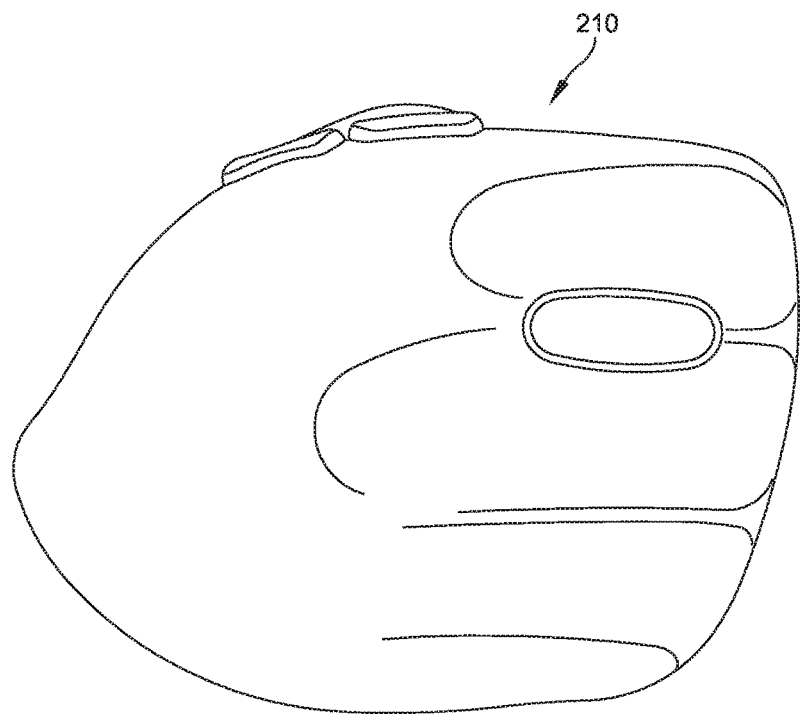
Figure 45:
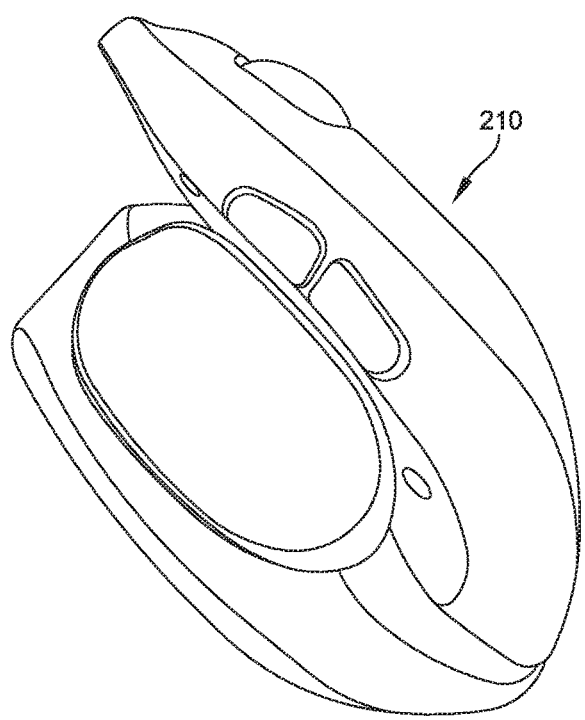
Figure 46:
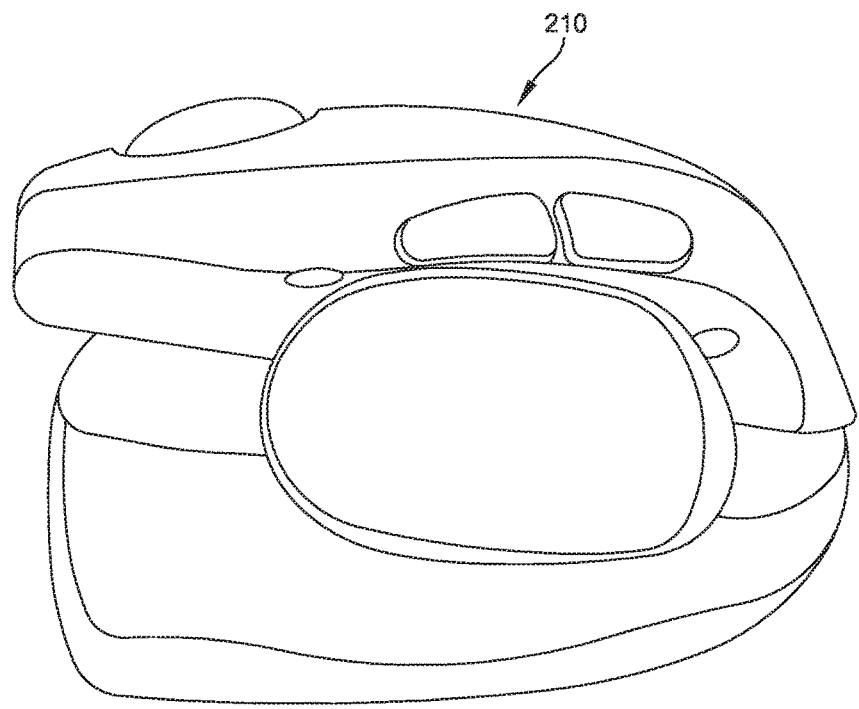
Figure 47:
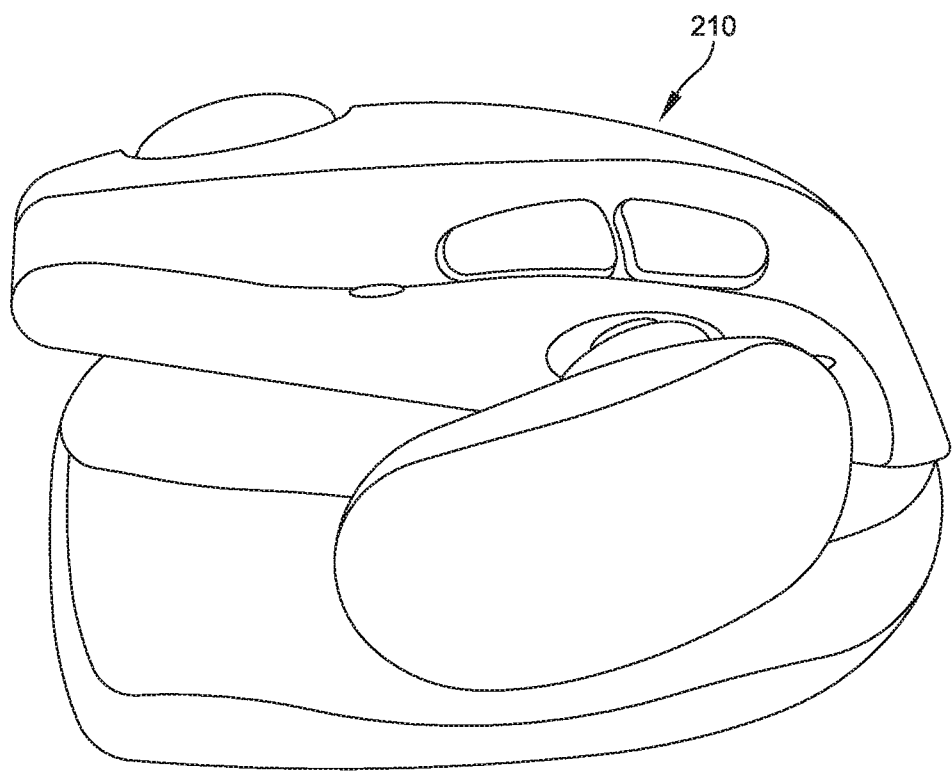

Referring to FIGS. 40A, 40B and 40C, an adjustable mouse of another embodiment is generally indicated at 200, which is similar to the adjustable mouse 60 shown in FIGS. 17-26. As shown, the adjustable mouse 200 includes a palm rest portion 202 and a thumb rest portion 204. The palm rest portion 202 includes a two-part palm engagement portion 206 and three finger portions 208, 210, 212. The finger portions 208, 210, 212 are configured to expand to enable a user's cramped hand to expand vertically and to extend the finger tips horizontally to relieve discomfort. The expansion of the finger portions 208, 210, 212 can be achieved by any suitable structure, such as rods attached to individual buttons to the base of the adjustable mouse 200. The rods can be connected to a ball joint or similar mechanism that enables easy manipulation of the fingers 208, 210, 212 of the adjustable mouse. The expansion of the finger portions 208, 210, 212 further can be achieved by the mechanisms used to extend the thumb adjustment assembly and the base adjustment assembly shown in FIGS. 11 and 12. In one embodiment, to secure the buttons in place, the ball joints can be friction-based or a magnet can be placed underneath or inside an input control area to magnetize and maintain the buttons in place. Alternatively, a lock and pin mechanism can be used to lock each button in place, or a rail system can be used to set a plane of travel.

In certain embodiments of the adjustable mouse disclosed herein, the tilting angle adjustment mechanisms of the palm rest portion with respect to the base portion are used to reposition the palm rest portion of the adjustable mouse towards either a vertical oriented placement or towards a more horizontal oriented placement. With some embodiments, the hinge is maintained in place by friction associated with the hinge; however the hinge can be locked in place by using a lock and pin arrangement, a brake pad, a lever, a button, or the like. In other embodiments, a screw or knob can be used to move gears that would allow the angle of the palm rest portion to be tilted with respect to the base portion. The screw or knob can be used to tighten or loosen the palm rest portion with respect to the base portion.

The tilting angle adjustment mechanisms disclosed herein allow a user to find a comfortable position for his or her hand in relation to the surface of a desk. The user can reposition to tilt angle to a new angle even when the user is used to a certain position. This functionality of the adjustable mouse helps reduce stress and tension on one area of the hand, and reduces the probability of causing a problem from over using a certain portion or applying constant pressure on a user's hand.

FIGS. 41-47 illustrate a mouse, generally indicated at 210, of another embodiment of the present disclosure. As shown, the mouse includes a thumb adjustment assembly and a base adjustment assembly.

As discussed herein, the extension of the component parts of the adjustable mouse can be achieved by having the finger and palm rest connected in one or more locations. This can be achieved by using a rod either connected to either the input controls and/or the palm extension fixed in position by a hollow cavity surrounding one or more rods that will direct the one or more rods in a set plane of motion. The one or more rods do not necessarily need to be cylindrical in shape, but must be held in a hollow cavity to allow a set plane of motion to be achieved. A rail system, gears, motor, divots, or even magnets can be used to move the input controls and the palm extension while locking them into place. The palm extension can also be configured to move upwards instead of extending towards the back. By enabling the input controls and the palm extension to extend and retract enables the user to size the adjustable mouse to the user's hand.

Other embodiments can include a microprocessor having sensors that are positioned inside the mouse that read the different adjustments and show them on a screen or saved to a personalized account. The microprocessor enables users to reposition the device to a preferred setting when the adjustable mouse is used by someone else. If saved to an account or in a general setting file, the microprocessor can also maintain DPI measurements, driver settings, and other information related to the use of the adjustable mouse. Other sensors can be provided inside the mouse to measure user activity, gauge light, and the like. Buttons positioned near a bottom of the mouse can be used to change commands of the buttons, such as disabling the right mouse click or altering a command of the right mouse button. A separate button can be added instead of using the same button as a DPI adjuster button.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:
1. An adjustable mouse comprising:
   a first base; and
   a thumb adjustment assembly coupled to the first base, the thumb adjustment assembly being configured to move a thumb rest portion between a retracted position and an extended position,
   wherein the thumb adjustment assembly includes a shaft that extends from a body of the thumb rest portion, the shaft being coupled to the first base to move the thumb rest portion toward and away from the first base,
   wherein the shaft is coupled to the first base by a pivot post that extends from the first base, the shaft being configured to pivot with respect to the pivot post and the first base, and
   wherein the shaft is secured to the thumb rest portion by a ball joint.
2. The adjustable mouse of claim 1, wherein the shaft is a telescoping shaft.
3. The adjustable mouse of claim 1, further comprising a palm rest portion hingedly attached to a second base by a hinge adjacent an outer edge of the second base and the palm rest portion,
   wherein the hinge is configured to position the palm rest portion at a desired angle in a stable position with respect to the second base.
4. The adjustable mouse of claim 3, wherein the hinge is a piano-type hinge.
5. The adjustable mouse of claim 3, further comprising curved rails to guide the palm rest portion and to direct the angle adjustment of the palm rest portion with respect to the second base.
6. The adjustable mouse of claim 3, wherein the palm rest portion has several finger buttons configured to expand in vertical and lateral directions.
7. The adjustable mouse of claim 3, wherein the hinge has sufficient friction to position the palm rest portion at a desired angle in a stable position with respect to the second base.
8. The adjustable mouse of claim 7, wherein the hinge is a piano-type hinge.
9. The adjustable mouse of claim 3, wherein the palm rest portion is tilted with respect to the second base by one wedge of a plurality of wedges that can be selected to vary a tilt of the palm rest portion with respect to the second base of the adjustable mouse.
10. The adjustable mouse of claim 9, wherein the one wedge of the plurality of wedges may be selected to provide a 10-degree, a 20-degree or a 30-degree angle with respect to a vertical axis.
11. The adjustable mouse of claim 1, further comprising a finger adjustment assembly positioned adjacent the palm rest portion to adjust a position of finger buttons.
12. The adjustable mouse of claim 11, wherein the finger adjustment assembly is configured to extend the finger buttons away from and toward the palm rest portion.
13. The adjustable mouse of claim 12, wherein the finger buttons are designed to be manipulated by the user's fore, index and ring fingers, respectively, and wherein a wheel is positioned between the finger buttons to be manipulated by the fore and index fingers.
14. The adjustable mouse of claim 1, further comprising a height adjustment assembly to raise a height and to tilt a position of the palm rest portion and finger buttons with respect to a second base.
15. The adjustable mouse of claim 14, wherein the height adjustment assembly includes a support member extending from the second base, the support member being configured to lock the palm rest portion and the finger buttons in a raised and tilted position with respect to the second base.
16. The adjustable mouse of claim 1, further comprising a height adjustment assembly coupled to a second base, the height adjustment assembly being configured to move a palm rest portion and finger buttons between a neutral position and a raised, tilted position.
17. The adjustable mouse of claim 1, further comprising a finger adjustment assembly coupled to the first base, the finger adjustment assembly being configured to move finger buttons between a neutral position for input control and an extended position for input control.
18. The adjustable mouse of claim 1, wherein the thumb rest portion includes two separate pieces, which are attached to one another by a hinge that allows a front piece to move with respect to a back piece.
19. The adjustable mouse of claim 18, wherein the hinge allows the front piece to change a curvature of the thumb rest portion itself by bending the front piece back and forth.
20. The adjustable mouse of claim 1, wherein the thumb rest portion is configured to tilt up and down by the ball joint that includes a ball and socket connector coupled to the shaft to achieve a variety of positions.
21. The adjustable mouse of claim 20, wherein the ball and socket connector includes a head portion that is received within a receptacle formed in the thumb rest portion, the receptacle being configured to receive the head portion attached to the shaft.
22. An adjustable mouse comprising:
   a first base; and
   a thumb adjustment assembly coupled to the first base, the thumb adjustment assembly being configured to move the thumb rest portion between a retracted position and an extended position,
   wherein the thumb rest portion includes two separate pieces, which are attached to one another by a hinge that allows a front piece to move with respect to a back piece.
23. The adjustable mouse of claim 22, wherein the hinge allows the front piece to change a curvature of the thumb rest portion itself by bending the front piece back and forth.

24. The adjustable mouse of claim 22, wherein the back piece is configured to tilt up and down by a ball and socket connector coupled to the first base to achieve a variety of positions.

25. The adjustable mouse of claim 24, wherein the ball and socket connector includes a head portion that is received within a receptacle formed in the back piece, the receptacle being configured to receive the head portion attached to a stem, wherein the thumb adjustment assembly includes the stem that is coupled to the first base, the stem being configured to move the thumb rest portion from the retracted position to the extended position.

* * * * *